(12) United States Patent
Sawada et al.

(10) Patent No.: US 8,567,875 B2
(45) Date of Patent: Oct. 29, 2013

(54) ANTI-SKID CONTROL DEVICE AND AUTOMATIC BRAKE CONTROL DEVICE

(75) Inventors: Mototsugu Sawada, Kariya (JP); Toru Minematsu, Chiryu (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 1179 days.

(21) Appl. No.: 12/247,586

(22) Filed: Oct. 8, 2008

(65) Prior Publication Data

US 2009/0095551 A1    Apr. 16, 2009

(30) Foreign Application Priority Data

Oct. 12, 2007   (JP) ................................ 2007-266457
Aug. 7, 2008    (JP) ................................ 2008-204101

(51) Int. Cl.
*B60T 8/66*   (2006.01)

(52) U.S. Cl.
USPC ........... 303/158; 303/170; 303/149; 303/148; 701/80

(58) Field of Classification Search
USPC ........ 303/147–149, 156–158, 170, 113.2, 20; 701/71, 73, 78, 80
See application file for complete search history.

(56) References Cited

U.S. PATENT DOCUMENTS

| | | | | |
|---|---|---|---|---|
| 4,489,382 A | * | 12/1984 | Jonner et al. ................. | 701/73 |
| 4,593,955 A | * | 6/1986 | Leiber ............................ | 303/148 |
| 5,570,936 A | * | 11/1996 | Ohmori et al. ................ | 303/170 |
| 5,934,770 A | * | 8/1999 | Okazaki ........................ | 303/150 |
| 6,019,441 A | * | 2/2000 | Lloyd et al. ................... | 303/156 |
| 6,219,610 B1 | * | 4/2001 | Araki ............................. | 701/72 |
| 6,592,192 B1 | * | 7/2003 | Kaneda et al. ................ | 303/156 |
| 6,880,900 B2 | * | 4/2005 | Hara et al. .................... | 303/170 |
| 6,890,041 B1 | * | 5/2005 | Ribbens et al. ............... | 303/126 |
| 7,216,939 B2 | | 5/2007 | Obai | |
| 7,448,700 B2 | * | 11/2008 | Terasaka ...................... | 303/164 |
| 7,775,608 B2 | * | 8/2010 | Schmidt et al. .............. | 303/148 |
| 7,857,399 B2 | * | 12/2010 | Kito et al. .................... | 303/119.1 |

(Continued)

FOREIGN PATENT DOCUMENTS

| | | |
|---|---|---|
| JP | 6-107156 A | 4/1994 |
| JP | 2005-297805 A | 10/2005 |
| JP | 2006-315526 A | 11/2006 |
| WO | WO 2007/031567 A1 * | 3/2007 |

OTHER PUBLICATIONS

Japanese Office Action issued Nov. 28, 2012 by the Japanese Patent Office in Japanese Patent Application No. 2008-204101 and English language translation of Japanese Office Action (5 pgs).

*Primary Examiner* — Thomas Irvin

(74) *Attorney, Agent, or Firm* — Buchanan Ingersoll & Rooney PC

(57) ABSTRACT

An anti-skid control device or an automatic brake control device gradually increases a W/C pressure for a boost control valve for a front wheel FR or FL on a high-μ surface, by repeating a cycle in which the differential pressure for the boost control valve at the high-μ surface side is kept at the first differential pressure for a first period, and after that kept at the second differential pressure for a second period. Therefore, it is possible to suppress the individual variation in the capability for W/C pressure boosting, and accordingly to suppress the difference of the W/C pressures between the right front wheel and the left front wheel. Thus, it is possible to suppress the yaw torque applied to the vehicle and therefore to suppress the spin of the vehicle.

11 Claims, 11 Drawing Sheets

(56) References Cited

U.S. PATENT DOCUMENTS

| | | | |
|---|---|---|---|
| 8,068,967 B2 * | 11/2011 | Schutz et al. | 701/73 |
| 8,342,616 B2 * | 1/2013 | Sawada | 303/113.2 |
| 2005/0189163 A1 * | 9/2005 | Barton et al. | 180/446 |
| 2005/0206228 A1 * | 9/2005 | Ohtsu | 303/119.1 |
| 2006/0255659 A1 * | 11/2006 | Obai | 303/146 |

* cited by examiner

ANTI-SKID CONTROL DEVICE AND AUTOMATIC BRAKE CONTROL DEVICE

CROSS REFERENCE TO RELATED APPLICATION

This application is based on and incorporates herein by reference Japanese patent applications No. 2007-266457 filed on Oct. 12, 2007 and No. 2008-204101 filed on Aug. 7, 2008.

FIELD OF THE INVENTION

The present invention relates to an ABS control device for a vehicle which performs an anti-skid control (hereinafter referred to as an ABS control) for preventing wheels of the vehicle from locking while braking. The present invention also relates to an automatic brake control device for automatically applying brake fluid pressure to a wheel cylinder (hereinafter referred to W/C). This operation is performed in controls such as anti-side slip control, an active cruise control, and a traction control.

BACKGROUND OF THE INVENTION

In Japanese Patent Application Publication No. JP-A-H6-107156, a conventional control is disclosed which operates when a vehicle is running on a μ-split surface, in other words, when a friction coefficient (hereinafter referred to as "surface μ" or just simply as "μ") of a road surface differs between a left side wheel and a right side wheel of the vehicle. In the conventional control, the front wheel on an area of the μ-split surface with higher surface μ is alternately under an independent limiting control and a select-low control. The area of the μ-split surface with higher surface μ is hereinafter referred to as a high-μ surface. This control is aimed at gaining as much braking force as possible while suppressing the spin of the vehicle.

The independent limiting control is a control for limiting, based on a control for the front wheel with a larger slip, upward tendency of braking force at the other front wheel.

The select-low control includes a control in the case that the ABS control is started for the wheel on an area of the μ-split surface with lower surface μ. The wheel on an area of the μ-split surface with lower surface μ is referred to as a low-μ surface. In this case, the select-low control starts a decompression control in the ABS control for the wheel on the high-μ surface as well as for the wheel on the surface-μ irrespective of whether the wheel on the high-μ surface satisfies a condition for starting the ABS control.

The independent limiting control can gain as much braking force as possible at the wheel on the high-μ surface by generating on the μ-split surface a higher braking force at the wheel on the high-μ surface than that at the wheel on the low-μ surface. However, when the difference between the surface μs at the right side wheel and the left side wheel is large, the difference in the slip ratio between the left front wheel and the right front wheel becomes large. This makes it difficult for the vehicle to get its yaw torque under control, and the vehicle may accordingly start spinning.

Therefore, in the case that the difference in the slip ratio between the left front wheel and the right front wheel is large, the select-low control operates. Although the select-low control cannot gain as much braking force as the independent limiting control, it can prevent the vehicle from spinning because it suppresses the yaw torque applied to the vehicle by generating the same the braking force at the left and right front wheels.

SUMMARY OF THE INVENTION

A boost control valve is used for a pressurizing control within the ABS control. The pressurizing control includes linear driving in which an indicator current to be supplied to the boost control valve is controlled in order to linearly control the differential pressure between the upstream side and the downstream side of the boost control valve.

Conventionally, individual variation of the boost control valve causes deviation in the relation (hereinafter referred to as current-pressure relation) between the value of the indicator current and the value of the differential pressure actually generated based on the indicator current. Therefore, if two boost control valves having different characteristics in the current-pressure relation are installed respectively to the left side wheel and the right side wheel, the difference between the brake fluid pressures generated at respective wheel cylinders deviate from an expected value. Therefore, it is difficult to keep the difference in the W/C pressure between the right side wheel and the left side wheel within a satisfactory range. A brake fluid pressure of a W/C is hereinafter referred to as a W/C pressure.

Therefore, unexpected yaw torque may be applied to the vehicle. Especially, it is difficult to suppress the yaw torque to a satisfactory extent when the vehicle is running on the μ-split surface. As a result, the spin of the vehicle cannot be effectively prevented.

It is therefore an object of the present invention to provide an ABS control device for a vehicle which prevents the vehicle from slipping by making it possible to suppress the difference in the W/C pressure between the left front wheel and the right front wheel within a satisfactory range irrespective of the deviation in the characteristics of W/C pressure boosting caused by the individual variation of the boost control valve.

In a first aspect of the present invention, an anti-skid control device for a vehicle controls an amount of the current to be supplied to the solenoid of the boost control valve in performing a pressurization control for the wheel under an anti-skid control so that a cycle is repeated in which a differential pressure to be generated between an upstream side and a downstream side of the boost control valve is switched between a first differential pressure and a second differential pressure which is larger than the first differential pressure.

With this operation in which the differential pressure of the boost control valve is repeatedly switched between the first differential pressure and the second differential pressure, it becomes possible to reduce deviation of an expected value from an actual value of the difference in the W/C pressure between wheels. Therefore, it is possible to prevent the vehicle from slipping by suppressing the difference in the W/C pressure between the left front wheel and the right front wheel within a satisfactory range irrespective of the deviation in the characteristics of W/C pressure boosting caused by the individual variation of the boost control valve.

In a second aspect of the present invention, an anti-skid control device for a vehicle calculates estimations of wheel cylinder pressures for left and right front wheels of the vehicle; determines based on the estimations of the wheel cylinder pressures whether the vehicle is running on the μ-split surface and which one of the left side part and the right side part of the vehicle is on the high-μ surface; controls, in performing a pressurization control for the wheel on the high-μ surface of the μ-split surface, the amount of the current to be supplied to the solenoid of the boost control valve for the wheel on the high-μ surface so that a cycle is repeated in which the differential pressure to be generated between the upstream side and the downstream side of the boost control valve for the wheel on the high-μ surface is switched between a first differential pressure and a second differential pressure which is larger than the first differential pressure.

Thus, this anti-skid control device increases the W/C pressure for the wheel on the high-μ surface by switching repeatedly the differential pressure of the boost control valve for the front wheel on the high-μ surface between the first differential pressure and the second differential pressure. Therefore it is possible to suppress the deviation in the characteristics of W/C pressure boosting and to suppress the difference in the W/C pressure between the left front wheel and the right front wheel within a satisfactory range. As a result, it is possible to suppress the yaw torque applied to the vehicle and to prevent the vehicle from slipping.

The anti-skid control device may keep the differential pressure to be generated between the upstream side and the downstream side of the boost control valve for the wheel on the high-μ surface at the first differential pressure for a first period and after the first period at the second differential pressure for a second period.

The anti-skid control device may supply the solenoid with a first current in switching to the first differential pressure, wherein an amount of the first current is larger than a minimum value, and the minimum value is an amount of a current for putting the boost control valve in a communicated state.

In order to generate the first differential pressure between the upstream side and the downstream side of the boost control valve for the front wheel on the high-μ surface, the anti-skid control device may supply the solenoid of the boost control valve with a current an amount of which is equal to or slightly larger than the minimum value. However, if the amount of the current supplied to the solenoid is equal to the minimum value, the valve body (or valve disc) of the boost control valve has to be moved to the place farthest from the valve seat every time the differential pressure is switched from the second differential pressure to the first differential pressure, and pulsation and oil hammer of the brake fluid accordingly occur. Therefore, it is better to set the amount of the current to the solenoid to the value slightly larger than the minimum value in achieving the first differential pressure.

The anti-skid control device may supply the solenoid with a second current in switching to the second differential pressure, wherein an amount of the second current is smaller than a maximum value, and the maximum value is an amount of a current for putting the boost control valve in a closed state.

In order to generate the second differential pressure between the upstream side and the downstream side of the boost control valve for the front wheel on the high-μ surface, the anti-skid control device may supply the solenoid of the boost control valve with a current an amount of which is equal to or slightly smaller than the maximum value. However, if the amount of current supplied to the solenoid is equal to the maximum value, the valve body of the boost control valve has to be moved all the way to the place where the valve body touches the valve seat every time the differential pressure is switched from the first differential pressure to the second differential pressure, and pulsation and oil hammer of the brake fluid accordingly occur. Therefore, it is better to set the amount of the current to the solenoid to the value slightly smaller than the maximum value in achieving the second differential pressure.

The anti-skid control device may hold the wheel cylinder pressure for one of the front wheels on the high-μ surface in first and second cases, the first case being that the anti-skid control is started on the μ-split surface, then the front wheel on the high-μ surface is decompressed in a decompression mode, then the front wheel on the high-μ surface is pressurized in a pressurization mode, and in the pressurization mode one of the front wheels on low-μ surface is set to a decompression mode in the anti-skid control, the second case being that the difference between the estimations of the wheel cylinder pressure for the front wheels is larger than a threshold.

In addition, the anti-skid control device may control in a third case the amount of the current for the solenoid of the boost control valve for the wheel on the high-μ surface so as to gradually increase the wheel cylinder pressure for the wheel on the high-μ surface at a first increase rate which is smaller than that in the case the boost control valve is set to the communicated state, the third case being that the wheel on the low-μ surface is not set to a decompression mode in the anti-skid control, and the difference between the estimated wheel cylinder pressure for the front wheels is equal to or smaller than the threshold.

Further, the anti-skid control device may repeat, while the wheel cylinder pressure is gradually increased at the first increase rate, the cycle in which the differential pressure is switched between the first differential pressure and the second differential pressure.

Especially in the case that the W/C pressure is increased gradually, effect of the deviation of the pressure increase rate caused by the individual variation becomes prominent. Therefore, it is better in this case to repeat the cycle in which the differential pressure is switched between the first differential pressure and the second differential pressure.

In the above embodiments, ABS control devices for performing an ABS control are described as several aspects of the present invention. However, the present invention can be applied to an automatic brake control device for: sucking and discharging brake fluid by means of a pump so as to generate a wheel cylinder pressure at a wheel cylinder for a wheel being under an automatic brake control; and linearly changing an amount of a current to be supplied to a boost control valve for controlling pressurization of a wheel cylinder so as to control a differential pressure between an upstream side and downstream side of the boost control valve. For example, the automatic brake control device can achieve advantage similar to the ABS control devices in the first aspect if the first aspect is applied to automatic brake control device.

BRIEF DESCRIPTION OF THE DRAWINGS

The invention, together with additional objective, features and advantages thereof, will be best understood from the following description, the appended claims and the accompanying drawings. In the drawings:

DETAILED DESCRIPTION OF THE EMBODIMENTS

Hereinafter, embodiments of the present invention are described with reference to the above figures.

First Embodiment

Figure 1:
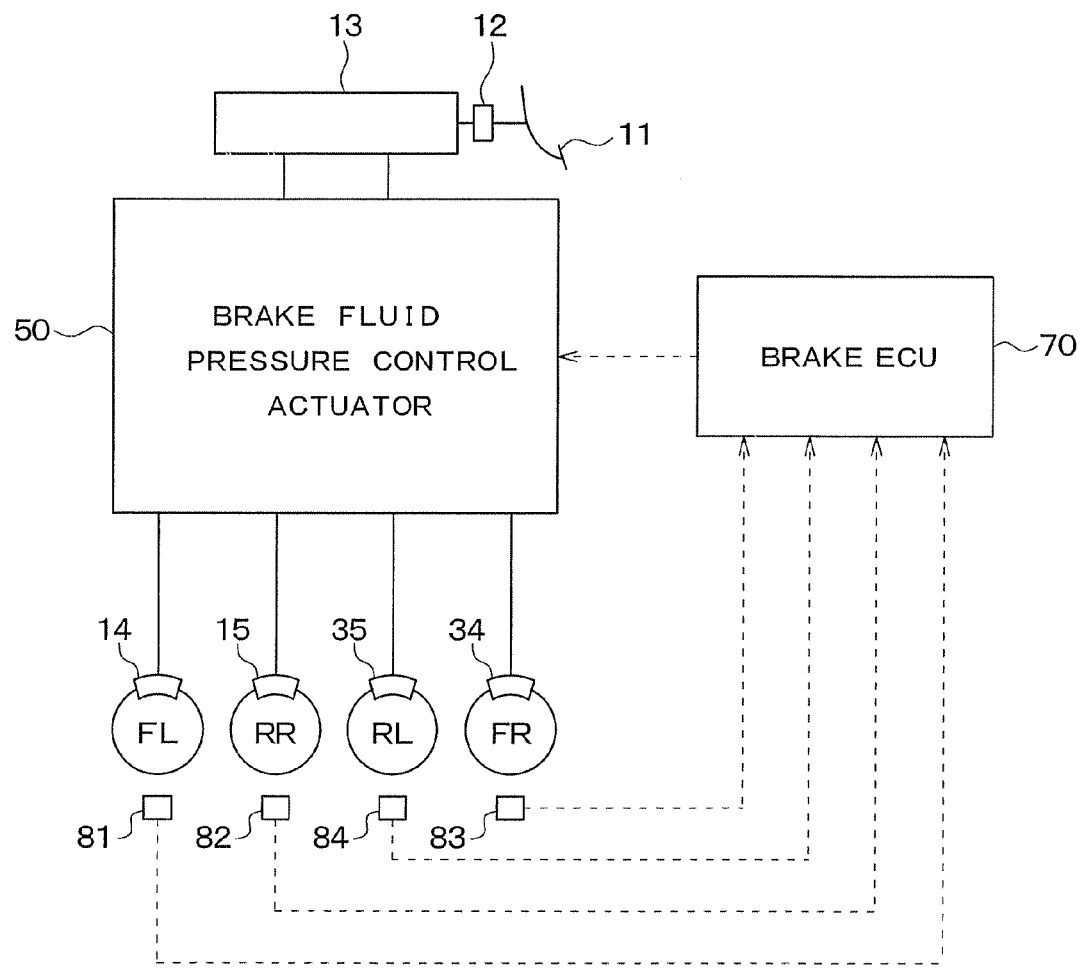
FIG. 1 is a block diagram showing functions of a brake control device serving as an ABS control device according to a first embodiment of the present invention.

A first embodiment of the present invention is described. FIG. 1 is a block diagram showing functions of a brake control device 1 for a vehicle serving as an ABS control device according to the present embodiment. Specifically, a part of the brake control device 1 serves as the ABS control device when the part performs ABS control.

First, the brake control device 1 of the present invention is described. As shown in FIG. 1, the brake control device 1 includes a brake pedal 11, a servo unit 12, a master cylinder 13 (hereinafter referred to as M/C 13), W/Cs 14, 15, 34, 35, and an actuator 50 for controlling brake fluid pressure. The brake control device 1 also includes a brake ECU 70. The brake ECU 70 operates as a part of various brake control means to control braking forces generated by the brake control device 1. More specifically, the brake control device 1 includes wheel speed sensors 81 to 84 for outputting a detection signal which is a pulse signal varying based on the speed of wheels FL, FR, RL, RR of the vehicle, respectively. The detection signals from the wheel speed sensors 81 to 84 and other detection signals from other sensors described later are inputted into the brake ECU 70. The brake ECU 70 executes various calculations based on the inputted detection signals and controls the braking forces based on the calculations.

Figure 2:
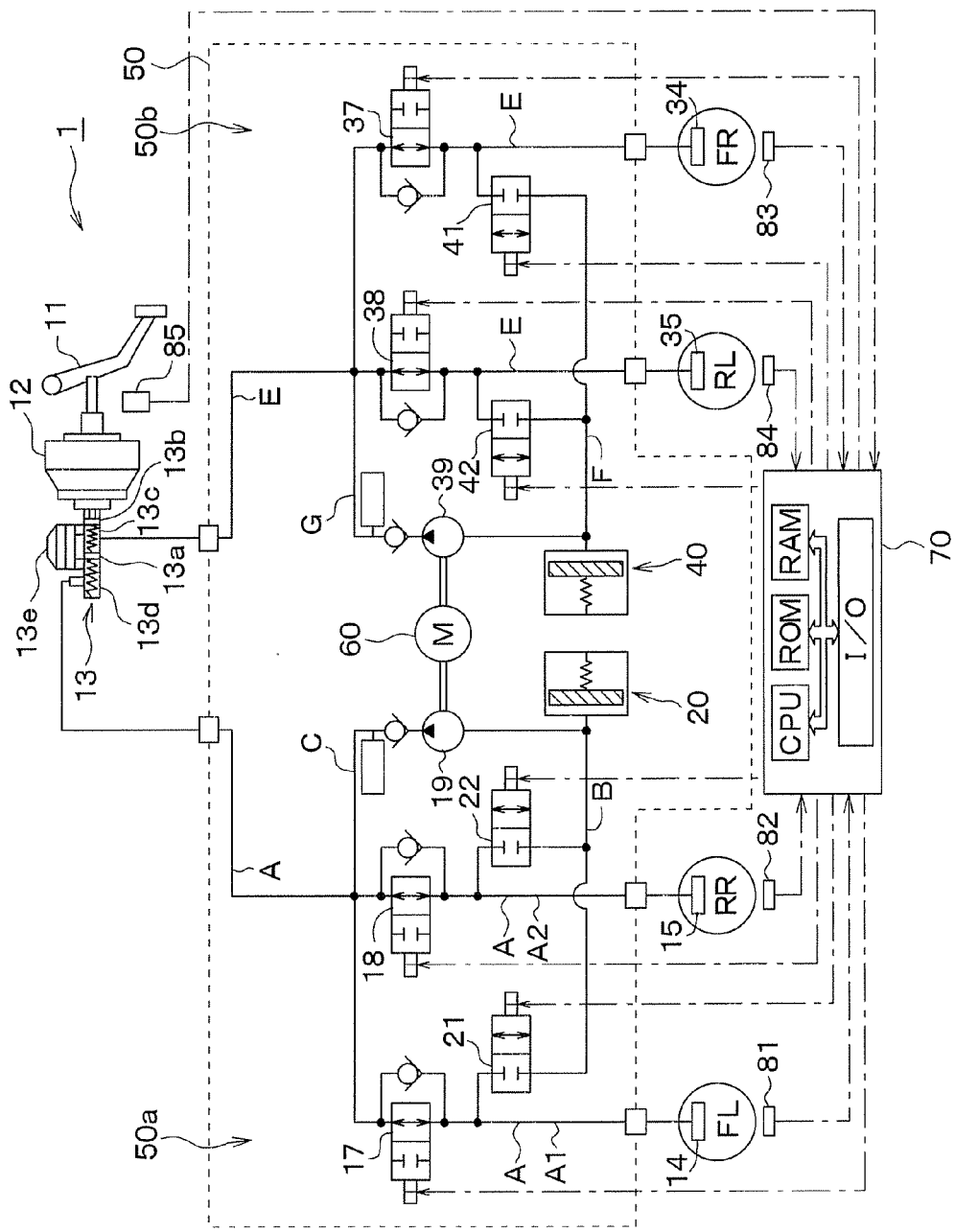
FIG. 2 is a diagram showing detailed structure of portions constituting the brake control device 1.

FIG. 2 shows detailed structure of portions constituting the brake control device 1. As shown in FIG. 2, when a driver depresses the brake pedal 11, the depression force is doubled by the servo unit 12 and pushes master pistons 13a and 13b located in the M/C 13. As a result, the same M/C pressure is generated in a primary chamber 13c and a secondary chamber 13d defined by the master pistons 13a and 13b. The M/C pressure is transmitted to the respective wheel cylinders 14, 15, 34, and 35 through the actuator 50.

The master cylinder 13 is provided with a master reservoir 13e having a passage that is in communication with the primary chamber 13c and the secondary chamber 13d.

The actuator 50 includes a first conduit system 50a and a second conduit system 50b. The first conduit system 50a controls a brake fluid pressure applied to a left front wheel FL and a right rear wheel RR, and the second conduit system 50b controls a brake fluid pressure applied to a right front wheel FR and a left rear wheel RL.

The first conduit system 50a and the second conduit system 50b have a similar structure. Accordingly, in the following description, only the first conduit system 50a will be explained and the explanation of the second conduit system 50b will be omitted.

The first conduit system 50a includes a conduit A serving as a main conduit. The conduit A transmits the aforementioned M/C pressure to the wheel cylinder 14 provided at the left front wheel FL and the wheel cylinder 15 provided at the right rear wheel RR to generate a W/C pressure.

The conduit A branches into two conduits A1 and A2. A first boost control valve 17 is provided in the conduit A1, and controls the increase in the brake fluid pressure to the W/C 14. A second boost control valve 18 is provided in the conduit A2, and controls the increase in the brake fluid pressure to the W/C 15.

Each of the first and second boost control valves 17 and 18 serves as a linear control valve, which linearly controls differential pressure generated between the upstream side and the downstream side thereof. Basically, each of the first and second boost control valves 17 and 18 is constructed as an electrical valve of normally open type. The normally open valves 17 and 18 can be controlled between a communicated state and a closed state. When a control current applied to solenoid coils provided in the normally open valves 17, 18 is zero (i.e. when no current is applied), the normally open valves 17, 18 are controlled to the communicated state. The first and second boost control valves 17 and 18 operate as a linear valve when an indicator current corresponding to a required differential pressure is applied to the solenoid coils from the brake ECU 70, A conduit B serving as a pressure reducing conduit connects a section of the conduit A between the first boost control valve 17 and the W/C 14 with a reservoir 20, and connects a section of the conduit A between the second boost control valves 18 and the W/C 15 with the reservoir 20. The conduit B is provided with a first pressure reducing control valve 21 and a second pressure reducing control valve 22 each formed by a two-position electromagnetic valve that can be controlled to a communicated state and a closed state. The first and the second pressure reducing control valves 21, 22 are normally closed valves. When a control current applied to solenoid coils provided in the normally closed valves 21, 22 is zero (i.e. when no current is applied), the normally open valves 21, 22 are controlled to the closed state.

Further, a conduit C serving as a reflux conduit is provided between the reservoir 20 and the conduit A serving as the main conduit. The conduit C is provided with a self-priming pump 19 that is driven by a motor 60. The self-priming pump 19 sucks up brake fluid from the reservoir 20 and discharges it to the M/C 13 side or the W/Cs 14, 15 side.

The brake ECU 70, which corresponds to the ABS control device of the present invention, controls a control system of the brake control system 1. The brake ECU 70 is a known microcomputer provided with a central processing unit (CPU), a read only memory (ROM), a random access memory (RAM), an input/output (I/O) port, and the like. The brake ECU 70 performs processing, such as various types of calculation, according to programs stored in the ROM and the like. For example, the brake ECU 70 calculates wheel speeds based on detection signals received from the wheel speed sensors 81 to 84 shown in FIGS. 1 and 2. Then the brake ECU 70 calculates the speed of the vehicle and obtains the deceleration of the vehicle by calculating time derivative of the speed of the vehicle. In addition, the brake ECU 70 also receives a detection signal from a stop lamp switch (STP) 85 and determines based on the detection signal whether braking is in operation or not.

Based on the electric signals from the brake ECU 70, current-supply-control and voltage-apply-control in the actuator 50 are performed. In the current-supply-control, electrical currents are supplied to the control valves 17, 18, 21, 22, 37, 38, 41, and 42. In the voltage-apply-control, voltages are applied to the motor 60 for driving the pumps 19 and 39. Accordingly, the W/C pressures generated at the W/Cs 14, 15, 34, and 35 are controlled and the braking forces of the wheels FL to RR are controlled.

More specifically, in the actuator 50, when the brake ECU 70 applies the driving voltage to the motor 60 and supplies the indicator currents to the solenoids of the control valves 17, 18, 21, 22, 37, 38, 41, and 42, the control valves 17, 18, 21, 22, 37, 38, 41, and 42 operate in accordance with the indicator currents, and available paths in the brake conduit systems are accordingly set. Then the brake fluid pressures are generated at the W/Cs 14, 15, 34, and 35 according to the determined available path. Thus, the braking forces generated at the wheels FL to FR are controlled.

Figure 3:
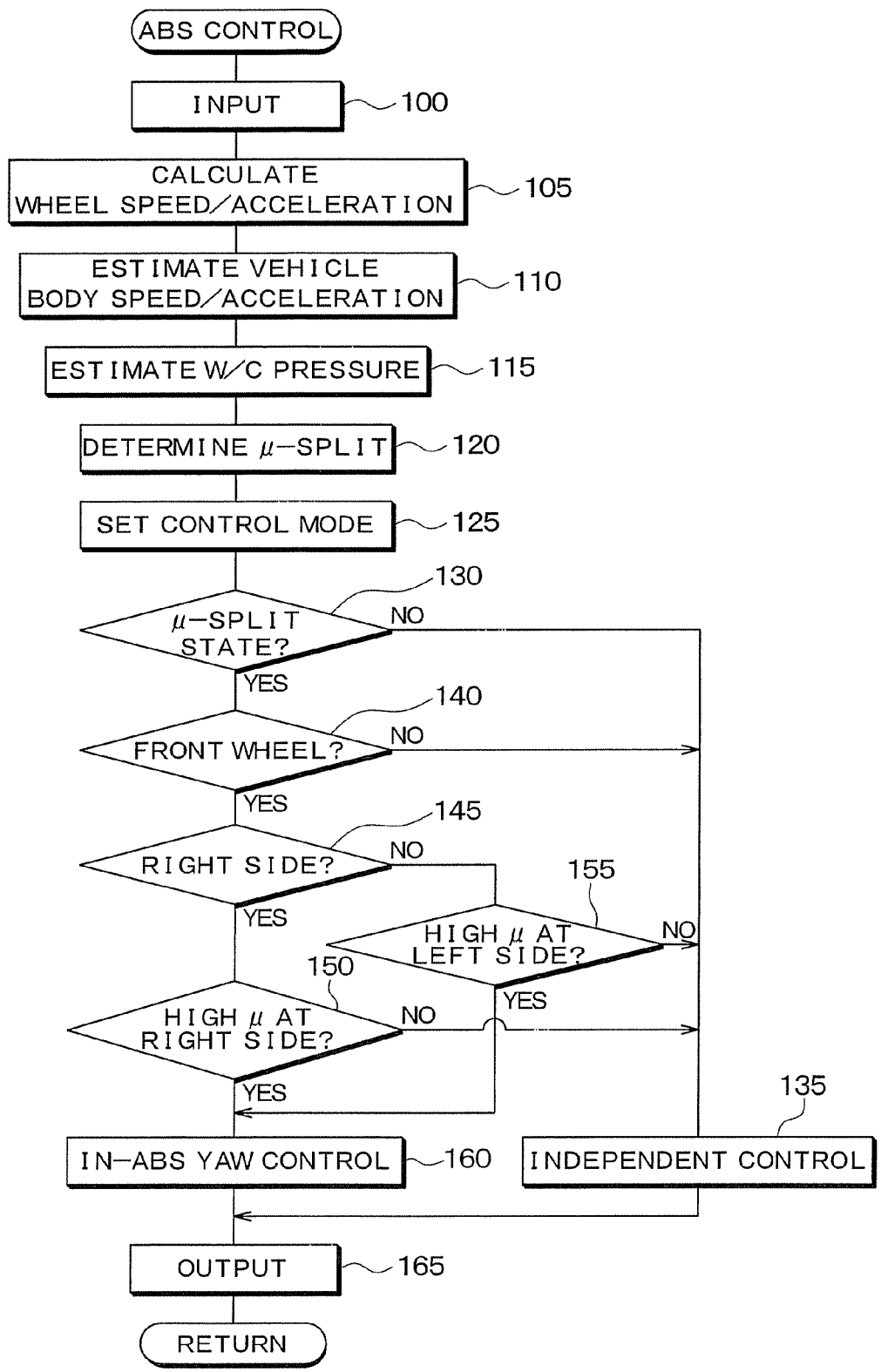
FIG. 3 is a flowchart showing an ABS control process including a control on a μ-split surface.
Figure 4:
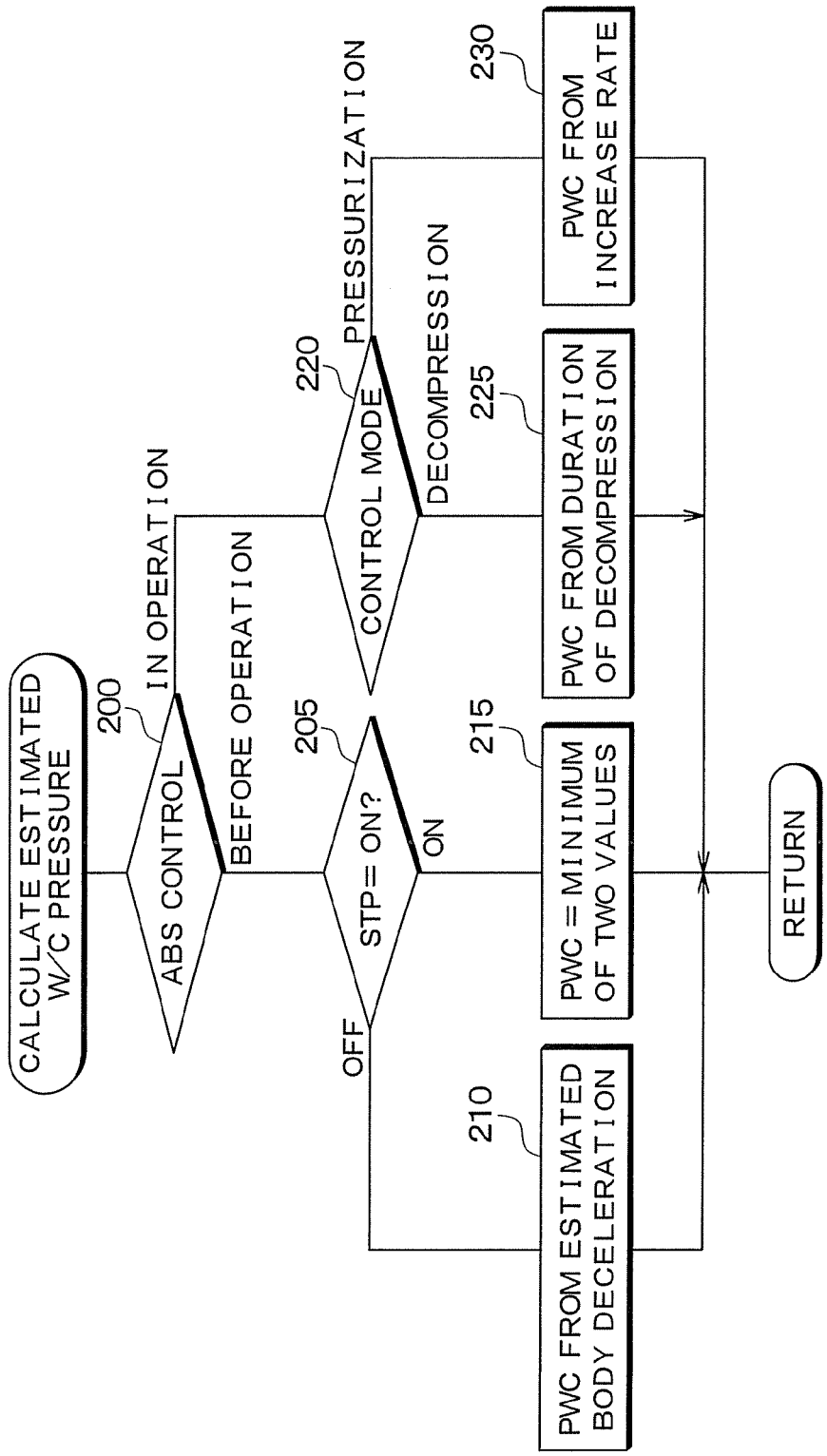
FIG. 4 is a flowchart showing details of calculating estimated W/C pressures.
Figure 5:
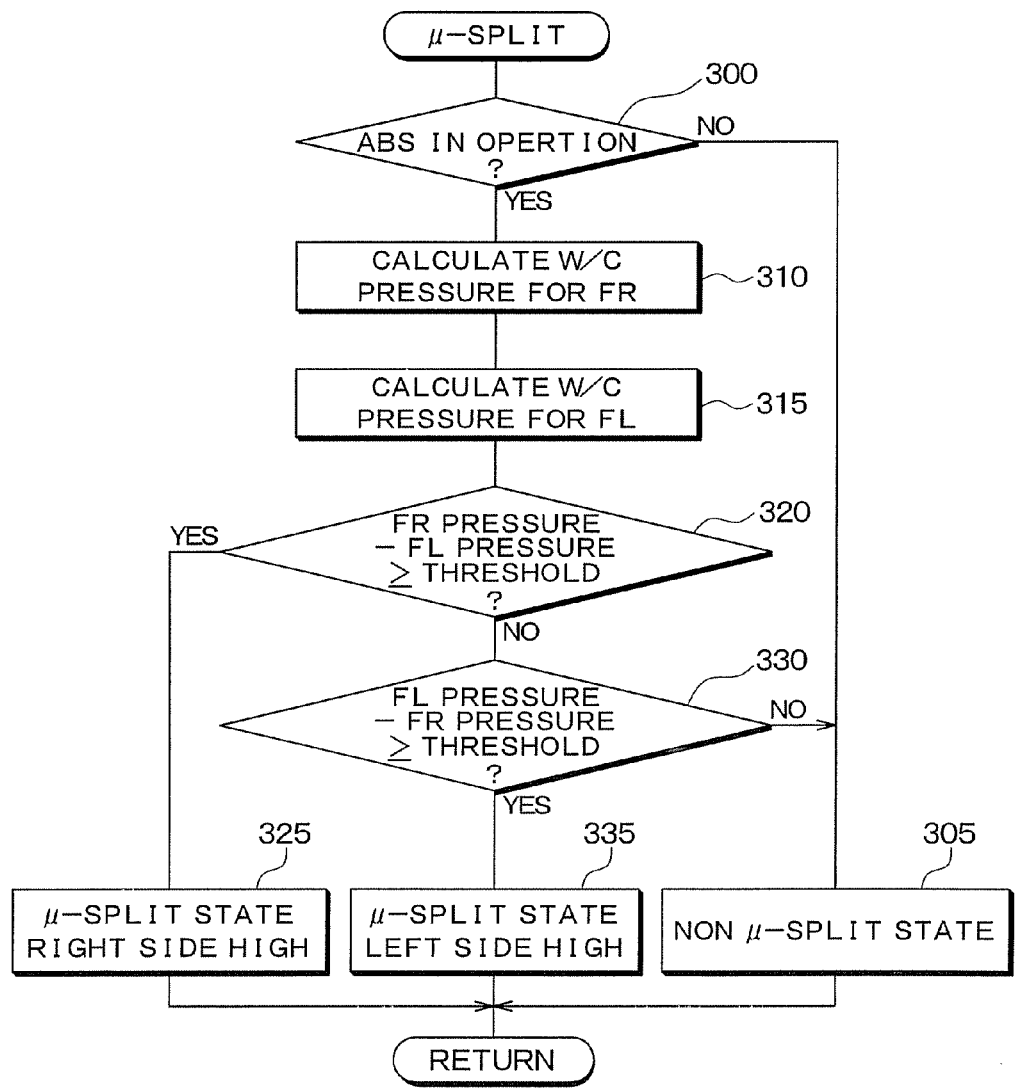
FIG. 5 is a flowchart showing details of a μ-split determination.
Figure 6:
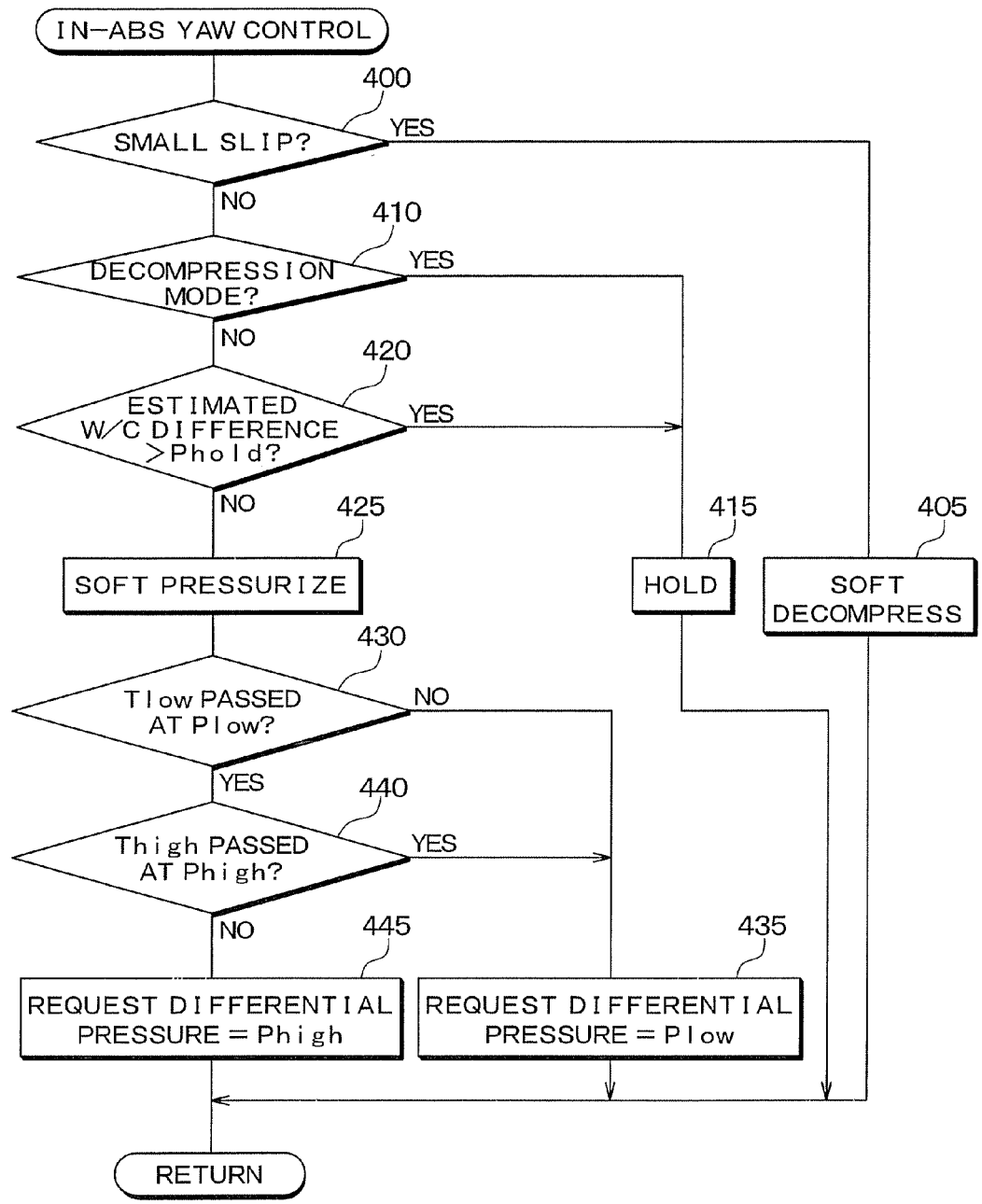
FIG. 6 is a flowchart showing details of an in-ABS yaw control.

Next, the detailed description is given of the ABS control of the brake control device 1 having the structure described above. FIG. 3 is a flowchart showing details of ABS control processes including controls on a $\mu$-split surface. FIGS. 4 to 6 are flowcharts each showing details of a process executed in the ABS control processes. Hereinafter, the ABS control processes are described with reference to FIGS. 3 to 6. The ABS control processes are executed for each of the wheels periodically at control periods when an ignition switch (not illustrated) is turned to ON.

First, at step 100 in FIG. 3, the brake ECU 70 executes an input process. More specifically, the brake ECU 70 receives the detection signals from the wheel speed sensors 81 to 84 and the stop lamp switch 85. Then at step 105, the brake ECU 70 calculates the wheel speeds of the wheels of the vehicle and obtains acceleration of the wheels by calculating the time derivative of the wheel speeds. Then at step 110, the brake ECU 70 calculates an estimation of the speed of the body of the vehicle (hereinafter referred to as an estimated vehicle body speed) by using well-known methods and obtains an estimation of the acceleration of the body of the vehicle (hereinafter referred to as an estimated vehicle body acceleration) by calculating the time derivative of the estimated vehicle body speed.

Then at step 115, the brake ECU 70 calculates estimations of the W/C pressures (hereinafter referred to as estimated W/C pressures). The ECU 70 is thus an example of means for calculating estimations of the wheel cylinder pressures for left and right front wheels of the vehicle. FIG. 4 is a flowchart showing the details of the calculation of the estimated W/C pressures.

First, at step 200, the brake ECU 70 determines whether the ABS control is in operation or not. As is described below, at step 125 of FIG. 3, it is determined whether the ABS control is started or not and a flag is set when a condition for starting the ABS control is satisfied. Therefore, it is possible to determine whether the ABS control is in operation or not based on whether the flag is set or not. If the brake ECU 70 determines that the ABS control is not in operation (i.e. that the ABS control is not yet in operation), the brake ECU 70 proceeds to step 205.

At step 205, the brake ECU 70 determines whether the stop lamp switch 85 is pressed or not. When the determination is negative, the braking is not in operation and the brake ECU 70 then proceeds to step 210 and calculates the estimated W/C pressures PWC based on estimated vehicle body deceleration (i.e. the additive inverse of the estimated vehicle body acceleration). The relation between the estimated vehicle body deceleration and the estimated W/C pressures PWC can be expressed by a well-known map or a well-known equation. Therefore, the estimated W/C pressures PWC can be obtained from the estimated vehicle body deceleration by using the map or the equation. Although the estimated W/C pressures PWC are obtained at step 205 through calculation, they are obviously zero in ordinary situations.

When the determination at step 205 is affirmative, the braking is in operation and the brake ECU 70 then proceeds to step 215. At step 215, the brake ECU 70 uses smaller one of two values as the estimated W/C pressures PWC. One of the two values is an estimation of the W/C pressure based on the time of onset of the braking. The other one of the two values is a value obtained based on the estimated vehicle body deceleration. Calculating the estimation of the W/C pressure based on the time of onset of the braking is well-known art. Therefore, detailed description of the art is omitted.

On the other hand, if the determination at step 200 is affirmative, the brake ECU proceeds to step 220 and determines whether a current control mode is a decompression mode or a pressurization mode. The control mode is determined in a control mode setting process at step 125, as described below. Therefore, the control mode determined at step 125 is used for the determination at step 220.

If the control mode is the decompression mode, the brake ECU 70 proceeds to step 225 to obtain current estimations of the W/C pressures by using first reference values which are estimations of the W/C pressures PWC obtained at step 215 before the ABS control is started. More specifically, the brake ECU 70 obtains the current estimations of the W/C pressures by subtracting pressure fall estimations from the first reference values. The pressure fall estimations are estimations of fall amounts of the W/C pressures during a period in which the decompression in the ABS control has continued.

If the control mode is the pressurization mode, the brake ECU 70 proceeds to step 230 to obtain the estimated W/C pressures by using second reference values, which are the estimated W/C values PWC obtained at step 225. More specifically, the brake ECU 70 obtains the estimated W/C pressures by adding the second reference values to estimations of a pressure raise amount which is derived from increase rate of the W/C pressure in the ABS control. Thus, calculation of the estimated W/C pressures shown in FIG. 4 is performed.

Then the brake ECU 70 proceeds to step 120 in FIG. 3 and executes $\mu$-split determination. The ECU 70 is an example of means for determining, based on the estimations of the wheel cylinder pressures, whether the vehicle is running on the $\mu$-split surface and which one of the left side part and the right side part of the vehicle is on the high-$\mu$ surface. In the $\mu$-split determination, the brake ECU 70 determines whether a road surface on which the vehicle is running is a $\mu$-split surface or not, and also determines whether an area of the $\mu$-split surface on which a left side wheel is moving is the high-$\mu$ surface or an area of the $\mu$-split surface on which a right side wheel is moving is the high-$\mu$ surface. FIG. 5 is a flowchart showing details of the $\mu$-split determination.

At step 300, the brake ECU 70 determines whether the ABS control is in operation or not by using the method described in step 200. If the determination is negative, the brake ECU 70 proceeds to step 305 to determine that the vehicle is not in a μ-split state. In this case, even if the vehicle is running on a μ-split surface, the difference of road μs between the left side wheel and the right side wheel is not likely to cause the vehicle to start spinning. This is the reason why the brake ECU 70 determines that the vehicle is not in a μ-split state at step 305. If the determination at step 300 is affirmative, the brake ECU 70 proceeds to step 310.

At step 310, the brake ECU 70 calculates the estimated W/C pressure for the right front wheel FR. The estimated W/C pressure of the right front wheel FR is proportional to the difference between the duration of the pressurization (i.e. pressure boosting) for the right front wheel FR and the duration of the decompression for the right front wheel FR. Therefore, the difference is used as the estimated W/C pressure of the right front wheel FR for the sake of convenience. It should be noted that the duration of the pressurization for the right front wheel FR is a time period set for right front wheel FR at the pressurization mode of the ABS control, and that the duration of the decompression for the right front wheel FR is a time period set for right front wheel FR at the decompression mode of the ABS control.

At step 315, the estimated W/C pressure for the left front wheel FL is calculated in a similar manner to the estimated W/C pressure for the right front wheel FR. The estimated W/C pressure of the left front wheel FL is proportional to the difference between the duration of the pressurization for the left front wheel FL and the duration of the decompression for the left front wheel FL. Therefore, the difference is used as the estimated W/C pressure of the left front wheel FL for the sake of convenience. It should be noted that the duration of the pressurization for the left front wheel FL is a time period set for left front wheel FL at the pressurization mode of the ABS control, and that the duration of the decompression for the left front wheel FL is a time period set for left front wheel FL at the decompression mode of the ABS control.

Then the brake ECU 70 proceed to step 320 to determine whether a right-left difference is equal to or larger than a first threshold (or a predetermined value), wherein the right-left difference is a result of subtraction of the estimated W/C pressure for the left front wheel FL obtained at step 315 from the estimated W/C pressure for the right front wheel FR obtained at step 310. In the case that the determination is affirmative, the estimated W/C pressure for the right front wheel FR is sufficiently larger than the estimated W/C pressure for the left front wheel FL. Therefore, the brake ECU 70 proceeds in this case to step 325 to determine that the vehicle is in the μ-split state and that the road surface below the right side wheel FR is a high-μ surface. Then the brake ECU 70 terminates the process.

If the determination at step 320 is negative, the brake ECU 70 proceeds to step 330 to determine whether a left-right difference is equal to or larger than a second threshold (or a predetermined value), wherein the left-right difference is a result of subtraction of the estimated W/C pressure for the right front wheel FR obtained at step 310 from the estimated W/C pressure for the left front wheel FL obtained at step 315. The second threshold has the same value with the first threshold used at step 320. In the case that the determination is affirmative, the estimated W/C pressure for the left front wheel FL is sufficiently larger than the estimated W/C pressure for the right front wheel FR. Therefore, the brake ECU 70 proceeds in this case to step 335 to determine that the vehicle is in the μ-split state and that the road surface below the left side wheel FL is a high-μ surface. Then the brake ECU 70 terminates the process.

In the case that both of the determinations at steps 320 and 330 are negative, there is not sufficient difference between the estimated W/C pressures for the right side wheel FR and the left side wheel FL to determine the vehicle is running on a μ-split surface. Therefore, the brake ECU 70 proceeds to step 305 to determine the vehicle is not in the μ-split state. Thus, the brake ECU 70 performs the μ-split determination.

Then, the brake ECU 70 proceeds to step 125 to set the control mode. In the process of the setting the control mode, the brake ECU 70 performs a determination as to whether a condition for starting the ABS control is satisfied or not, sets a decompression mode, a hold mode, and a pressurization mode, and determines whether a condition for terminating the ABS control is satisfied or not. These operations are not described in detail here because they are well-known arts. In the present embodiment, the outline of these operations is described.

When the slip ratio of the wheel on the low-μ surface exceeds a threshold for starting the ABS control, the brake ECU 70 performs a select-low control. In the select-low control, the brake ECU 70 starts a decompression control in the ABS control not only for the wheel on the low-μ surface but also for a wheel on the high-μ surface, irrespective of the slip ratio of the wheel on the high-μ surface. The ECU 70 is thus an example of means for performing select-low control when the vehicle is running on a μ-split surface to start decompression control in the anti-skid control for the wheel on a high-μ surface as well as for the wheel on the low-μ surface irrespective of whether the wheel on the high-μ surface satisfies a condition for starting the anti-skid control. When the condition for starting the ABS control is satisfied, the brake ECU 70 sets a corresponding flag and keeps the flag set until the condition for terminating the ABS control is satisfied. When either of the decompression mode, the hold mode, and the pressurization mode is set, the brake ECU 70 executes control corresponding to the set control based on an output process at step 165 described later. More specifically, the brake ECU 70 executes a decompression control when the decompression mode is set. Otherwise, the ECU 70 executes a hold control when the hold mode is set. Otherwise, the ECU 70 executes a pressurization control when the pressurization mode is set.

In the decompression control, the brake ECU 70 sets the first to fourth boost control valves 17, 18, 37, and 38 to the closed state and sets the pressure reducing control valves 21, 22, 41, and 42 to the communicated state. Then, the brake ECU 70 drives the motor 60 to cause the pumps 19 and 39 to operate. Thus, the brake fluid in the conduit A is let out from between the first boost control valve 17 and the W/C 14 to the first reservoir 20. In addition, the brake fluid in the conduit A is let out from between the second boost control valve 18 and the W/C 15 to the first reservoir 20. In the likewise manner, the brake fluid in the conduit B is let out from between the third boost control valve 37 and the W/C 34 to the second reservoir 40. In addition, the brake fluid in the conduit B is let out from between the fourth boost control valve 38 and the W/C 35 to the second reservoir 40.

Then the brake fluid is sucked and discharged by the pumps 19 and returns to a portion of the conduit A defined by the M/C 13, the boost control valve 17, and the boost control valve 18. In the likewise manner, the brake fluid is sucked and discharged by the pumps 39 and returns to a portion of the conduit B defined by the M/C 13, the boost control valve 37, and the boost control valve 38. Thus, the W/C pressures of the W/Cs 14, 15, 34, and 35 are decompressed. The ECU 70 is thus an example of means for sucking and discharging brake fluid by means of a pump so as to generate a wheel cylinder pressure at a wheel cylinder for a wheel being under an automatic brake control.

In the hold control, the brake ECU 70 sets the first to fourth boost control valves 17, 18, 37, and 38 to the closed state and sets the pressure reducing control valves 21, 22, 41, and 42 to the closed state. Thus, the W/C pressures of the W/Cs 14, 15, 34, and 35 are kept as they have been.

In the pressurization control, the brake ECU 70 starts supplying electrical currents to the first to fourth boost control valves 17, 18, 37, and 38 and sets the pressure reducing control valves 21, 22, 41, and 42 to the closed state.

More specifically, the brake ECU 70 initially controls the amounts of the currents (i.e. indicator currents) to the first to fourth boost control valves 17, 18, 37, and 38 so that each boost control valve causes a differential pressure which has been existed just before the onset of the pressurization control between the upstream side and the downstream side of the boost control valve. After that, the brake ECU 70 controls the amounts of the currents (i.e. indicator currents) to be supplied to the first to fourth boost control valves 17, 18, 37, and 38 so that the differential pressure caused by each of the boost control valves decreases gradually.

Thus, the difference between the W/C pressures generated at the W/Cs 14, 15, 34, 35 downstream of the respective first to fourth boost control valves 17, 18, 37, 38 and the high brake fluid pressures at the upstream side of the respective first to fourth boost control valves 17, 18, 37, 38 gets smaller. Therefore, the W/C pressures of the W/C 14, 15, 34, and 35 are increased.

Next, the brake ECU 70 proceeds to step 130 to determine whether the vehicle is in the μ-split state or not. This determination is performed based on the result of the μ-split determination at step 120. More specifically, the determination at the step 130 becomes affirmative if the brake ECU 70 has determined at step 325 or 335 that the vehicle is in the μ-split state. In contrast, the determination at the step 130 becomes negative if the brake ECU 70 has determined at step 305 that the vehicle is not in the μ-split state.

If the vehicle is not in the μ-split state, the brake ECU 70 proceeds to step 135 to perform an independent control. In the independent control, the brake ECU 70 performs normal ABS controls independently for the wheels FL to RR, respectively. Each of the normal ABS controls is an ABS control performed when the vehicle is running on an ordinary non μ-split surface.

If the vehicle is in the μ-split state, the brake ECU 70 proceeds to step 140 to determine whether the current ABS control process is performed for at least one of the front wheels FL and FR. If the determination is affirmative, the brake ECU 70 proceeds to step 145. If the determination is negative, the brake ECU 70 proceeds to step 135 to perform the independent control.

At step 145, the brake ECU 70 determines whether the current ABS control process is performed for the right front wheel FR or not. If the determination is affirmative, the brake ECU 70 proceeds to step 150 to determine whether the right front wheel FR is on the high-μ surface or not. If the determination at step 145 is negative, the current ABS control process is performed for the left front wheels FL and the brake ECU 70 therefore proceeds to step 155 to determine whether the left front wheel FL is on the high-μ surface or not.

For the wheel which is determined to be on the high-μ surface, the brake ECU 70 proceeds to step 160 to perform a yaw control in the ABS control (hereinafter referred to as an in-ABS yaw control). For the wheel which is determined to be not on the high-μ surface, the brake ECU 70 proceeds to step 135 to perform the independent control.

FIG. 6 shows a flowchart showing details of the in-ABS yaw control. At step 400, the brake ECU 70 determines whether a small slip is occurring on the vehicle or not. This small slip is a slip exceeding a small threshold which is smaller than another threshold used for the condition for starting the ABS control. The brake ECU 70 determines that the small slip is occurring when a slip ratio is larger than the small threshold, wherein the slip ratio is a deviation between the estimated vehicle body speed and speed of a wheel. In this case, the brake ECU 70 proceeds to step 405 to perform a soft decompression control. The soft decompression control is for performing the aforementioned decompression control for a short period by reducing the duration of decompression in the decompression control. At step 405, the brake ECU 70 calculates the indicator currents to be supplied to the solenoids of the first to fourth boost control valves 17, 18, 37, and 38 and the pressure reducing control valves 21, 22, 41, and 42, so that the indicator currents achieve the soft decompression control. When the small slip occurs, the soft decompression control can reduce the W/C pressure for the wheel FR or FL on the high-μ surface and accordingly suppress the slip.

If the determination at step 400 is negative, the brake ECU 70 proceeds to step 410 to determine whether a counter wheel is under the decompression mode or not. The counter wheel is the left front wheel FL if the in-ABS yaw control is performed for the right front wheel FR. Otherwise, the counter wheel is the right front wheel FR if the in-ABS yaw control is performed for the left front wheel FL.

If the determination at step 410 is affirmative, the brake ECU 70 proceeds to step 415 and performs the hold control. More specifically, in order to perform the hold control, the brake ECU 70 calculates at step 415 the indicator currents to be supplied to the solenoids of the first to fourth boost control valves 17, 18, 37, and 38 and the pressure reducing control valves 21, 22, 41, and 42.

If the pressurization control were performed although the counter wheel was under the decompression mode, the difference of the W/C pressures between the right front wheel FR and the left front wheel FL would increase to cause the vehicle to become unstable. Therefore, when the counter wheel is under the decompression mode, the brake ECU 70 performs the hold control to prevent the difference of the W/C pressures between the right front wheel FR and the left front wheel FL from increasing too much.

If the determination at step 410 is negative, the brake ECU 70 proceeds to step 420 to determine whether the absolute value of a difference value is larger than a threshold P_hold, wherein the difference value is a difference of the estimated W/C pressures PWC between the right front wheel FR and the left front wheel FL. The threshold P_hold may be a value within, for example, a range from 1 to 5 MPa. When the absolute value is not larger than the threshold P_hold, the difference value is not large yet. However, when the absolute value is larger than the threshold P_hold, the difference value is large.

Therefore, if the determination at step 420 is affirmative, the brake ECU 70 proceeds to step 415 to perform the aforementioned hold control. Thus, it is possible to prevent the difference of the estimated W/C pressures PWC between the right front wheel FR and the left front wheel FL from increasing too much.

When the determination at step 420 is negative, the brake ECU 70 proceeds to step 425 to perform a soft pressurization control. More specifically, in order to perform the soft pressurization control, the brake ECU 70 calculates at step 425 the indicator currents to be supplied to the solenoids of the first to fourth boost control valves 17, 18, 37, and 38 and the pressure reducing control valves 21, 22, 41, and 42. The soft pressurization control is for increasing the W/C pressure for the wheel on the high-μ surface at a relatively small pressure increase rate. The outline of the soft pressurization control is the same as that of the aforementioned normal pressurization control. The soft pressurization control can be achieved by slowing the change of the amounts of the currents to be supplied to the solenoids of the boost control valves 17, 18, 37, and 38.

In the present embodiment, the brake ECU 70 controls a request value for the differential pressure between the upstream side and the downstream side of the boost control valve 17 or 37 corresponding to the front wheel FR or FL on the high-μ surface. Hereinafter, the request value is referred to as a request differential pressure. More specifically, the brake ECU 70 periodically switches at a short interval the value of the request differential pressure between a relatively small first differential pressure P_low and a second differential pressure P_high which is larger than the first differential pressure P_low. More specifically, the brake ECU 70 causes the request differential pressure and the corresponding indicator current to change like pulse waves so that a cycle is repeated in which the value of the request differential pressure is kept at the first differential pressure P_low for a first period T_low, and after the first period it is kept at the second differential pressure P_high for a second period T_high. The ECU is thus an example of means for controlling, while performing pressurization control for the wheel on the high-μ surface of the μ-split surface, the amount of current to be supplied to the solenoid of the boost control valve for the wheel on the high-μ surface so that a cycle is repeated in which the differential pressure to be generated between the upstream side and the downstream side of the boost control valve for the wheel on the high-μ surface is switched between the first differential pressure and the second differential pressure which is larger than the first differential pressure.

The first differential pressure P_low is a pressure difference which is equal to or slightly larger than an open differential pressure generated when the boost control valve 17 or 37 corresponding to the front wheel FR or FL on the high-μ surface is in the communicated state (more specifically, a state in which the valve is fully open). The open differential pressure is equal to zero. In order to generate the first differential pressure P_low, the brake ECU 70 controls the current to be supplied to the boost control valve 17 or 37 corresponding to the front wheel FR or FL on the high-μ surface. More specifically, the brake ECU 70 sets the amount of the current to the minimum value (i.e. zero) or a value which is slightly larger than the minimum value.

If the first period T_low were too long, the corresponding W/C pressure would be increased too much. On the other hand, if the first period T_low were too short, the corresponding W/C pressure would not be increased to a satisfactory extent. Therefore, the first period T_low is set to a period which is based on a pressure increase rate in the soft pressurization control. For example, the first differential pressure P_low may be set to 2 MPa, and the first period T_low may be set to 12 ms.

The second differential pressure P_high is a pressure difference which is equal to or slightly smaller than a close differential pressure generated when the boost control valve 17 or 37 corresponding to the front wheel FR or FL on the high-μ surface is in the closed state (more specifically, a state in which the valve is fully closed). In order to generate the second differential pressure P_high, the brake ECU 70 controls the current to be supplied to the boost control valve 17 or 37 corresponding to the front wheel FR or FL on the high-μ surface. More specifically, the brake ECU 70 sets the amount of the current to the maximum value or a value which is slightly smaller than the maximum value. When the amount of the current is the maximum value, the corresponding boost control valve is in the closed state.

If the second period T_high were too long, the corresponding W/C pressure would be increased too slowly. On the other hand, if the second period T_high were too short, the first period T_low would become too long compared to the second period T_high and the corresponding W/C pressure would be accordingly increased too much. Therefore, the second period T_high is set to a period which is based on a pressure increase rate in the soft pressurization control. For example, the second differential pressure P_high may be set to 25 MPa, and the second period T_high may be set to 60 ms.

The brake ECU 70 executes step 430 and the following steps in order to repeat the cycle in which the differential pressure at the boost control valve 17 or 37 corresponding to the front wheel FR or FL on the high-μ surface is maintained at the first differential pressure P_low for the first period T_low and then maintained at the second differential pressure P_high for the second period T_high. Hereinafter, the boost control valve 17 or 37 corresponding to the front wheel FR or FL on the high-μ surface is referred to as a target valve.

More specifically, at step 430, the brake ECU 70 determines whether a period in which the request differential pressure for the target valve is kept at the first differential pressure P_low has reached the first period T_low. If the determination at step 430 is negative, the brake ECU 70 proceeds to step 435 to set the request differential pressure for the target valve to the first differential pressure P_low. Thus, the request pressure for the target valve is maintained at the first differential pressure P_low for the first period T_low.

If the determination at step 430 is affirmative, the brake ECU 70 proceeds to step 440 to determine whether a period in which the request differential pressure for the target valve is kept at the second differential pressure P_high has reached the second period T_high. If the determination at step 440 is negative, the brake ECU 70 proceeds to step 445 to set the request differential pressure for the target valve to the second differential pressure P_high. Thus, the request pressure for the target valve is maintained at the second differential pressure P_high for the second period T_high.

When the in-ABS yaw control is performed as described above, the brake ECU 70 proceeds to step 165 in FIG. 3 to execute an output process. In the output process, the brake ECU 70 supplies the solenoids of the first to fourth boost control valves 17, 18, 37, and 38 and the pressure reducing control valves 21, 22, 41, and 42 with the indicator currents which achieve the independent control at step 135 and the soft decompression control, the hold control, and the soft pressurization in the in-ABS yaw control. Thus, the aforementioned controls are performed.

Figure 7:
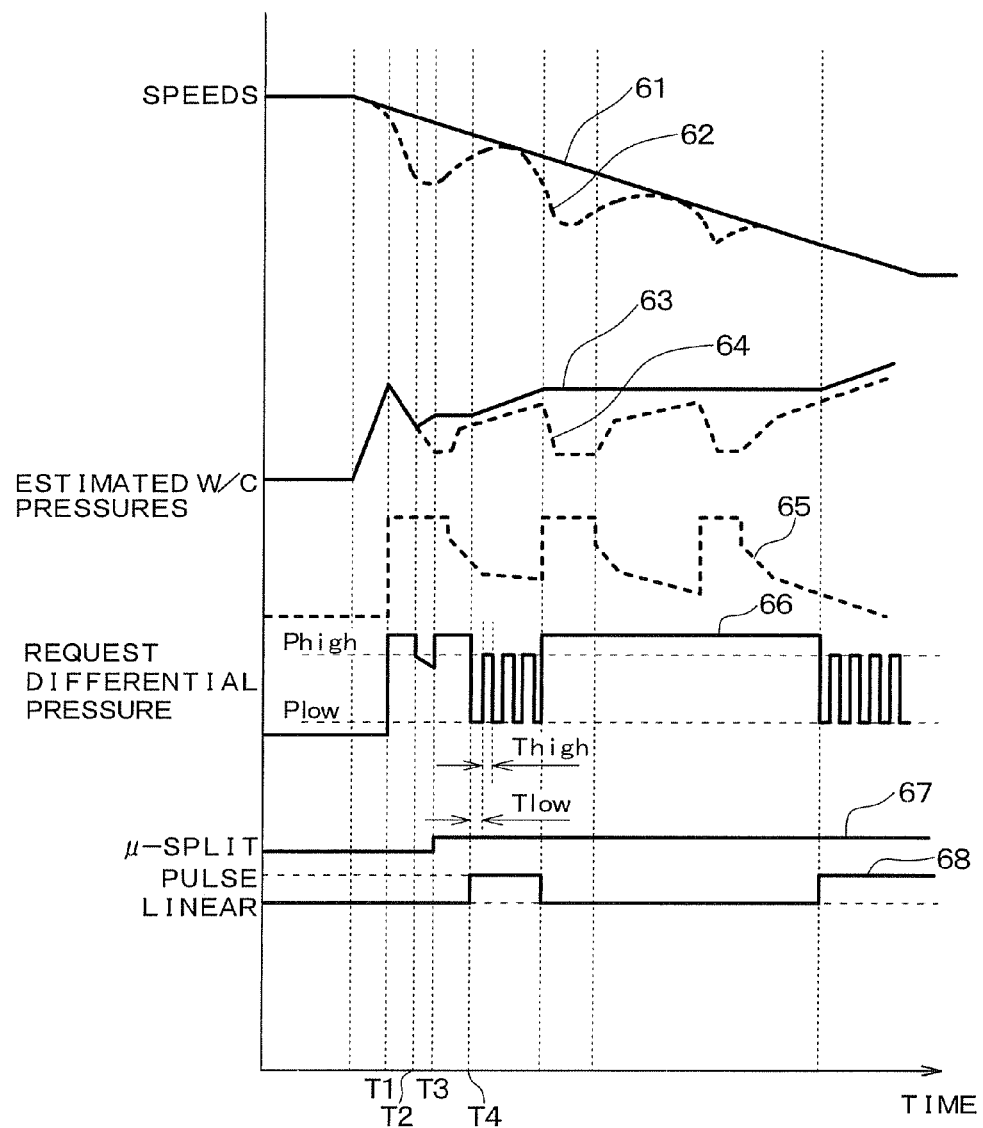
FIG. 7 is a timing diagram showing various quantities in the case that ABS control is performed when a vehicle is on a μ-split surface.

The effect of the ABS control is described with reference to FIG. 7. FIG. 7 is a timing diagram showing various quantities in the case that ABS control is performed when the vehicle is on a surface. The quantities includes, for example, the estimated vehicle body speed 61, the wheel speed 61 of the wheel on the high-μ surface, the wheel speed 62 of the wheel on the low-μ surface, the estimated W/C pressure 63 for the wheel on the high-μ surface, the estimated W/C pressure 64 for the wheel on the low-μ surface, the request differential pressure 65 for the low-μ surface side, the request differential pressure 66 for the high-μ surface side, the result 67 of the μ-split determination, and alternation 68 in indicator current for the boost control valve for the wheel on the high-μ surface between a pulse control and a linear control. The ECU 70 is thus an example of means for linearly changing, when an anti-skid control is started to prevent the vehicle from locking while braking, the amount of current supplied to the solenoid of the boost control valve which controls, when the pressurization control in the anti-skid control is in operation, pressure increase for the wheel cylinder of the wheel that us under the anti-skid control, thus controlling the differential pressure between the upstream side and the downstream side of the boost control valve.

After the start of braking, the wheel on the low-µ surface satisfies the condition for starting the ABS control at time T1 and the ABS control is accordingly started. At this time, the select-low control is performed in which both of the low-µ surface side and the high-µ surface side are set to the decompression mode. Then the decompression control is started and the corresponding W/C pressures are decreased.

In this situation, there is little deviation between the estimated vehicle body speed and the wheel speed at the high-µ surface side. Therefore, the wheel at the high-µ surface side is immediately released from the decompression mode and is set to the pressurization mode at time T2. Accordingly, the difference of the estimated W/C pressures grows between the high-µ surface side and the low-µ surface side, and the difference exceeds the threshold P_hold at time T3. Therefore, it is determined at the µ-spit determination at step 120 that the vehicle is running on the µ-spit surface. It is also determined at step 120 which one of the left side wheel FL and right side wheel FR is on the high-µ surface (see steps 325, 335).

When it is determined that the vehicle is on the µ-split surface, the in-ABS yaw control is performed for the wheel on the high-µ surface at step 160.

Thus, the W/C pressure for the wheel on the high-µ side is kept at T3, if the counter wheel is in the decompression mode (see step 410), or if the absolute value of the difference of the W/C pressures between the left front wheel FL and the right front wheel FR is larger than the threshold P_hold (see step 420). Therefore, it is possible to suppress the difference of the braking forces between the right side and the left side caused by the growing difference of the W/C pressures between the high-µ surface side and the low-µ surface side, while obtaining the braking forces to a satisfactory extent by holding the W/C pressure for the wheel on the high-µ surface.

When the wheel speed of the wheel on the low-µ surface is regained through the hold mode and the wheels are set to the pressurization mode at time T4, the absolute value of the difference of the estimated W/C pressures between the right front wheel FR and the left front wheel FL becomes equal to or smaller than the threshold P_hold again. Therefore, the W/C pressure for the wheel on the high-µ surface is gradually increased.

At this time, the cycle is repeated in which the differential pressure for the boost control valve 17 or 37 for the front wheel FR or FL on the high-µ surface is kept to the first differential pressure P_low for a first period T_low, and after that kept to the second differential pressure P_high for a second period T_high (see steps 430 to 435). More specifically, the request differential pressure (or the corresponding indicator current) is sent from the brake ECU 70 to the boost control valve 17 or 37 for the front wheel FR or FL on the high-µ surface and behaves like pulse waves.

Therefore, it is possible to suppress exceedingly rapid increase of the boost control valves 17 and 37 even if the individual variance of each of the boost control valves 17 and 37 causes the differential pressure actually generated at the valve to deviate and to become larger than the request differential pressure sent to the boost control valve. On the other hand, it is possible to obtain the increase amount of the boost control valves 17 and 37 to an extent even if the individual variance of each of the boost control valves 17 and 37 causes the differential pressure actually generated at the valve to deviate and to become smaller than the request differential pressure sent to the boost control valve The brake ECU 70 is thus an example of means (fourth means) for: holding the wheel cylinder pressure for one of the front wheels on the high-µ surface in first and second cases, the first case being that the anti-skid control is started on the µ-split surface, then the front wheel on the high-µ surface is decompressed in a decompression mode, then the front wheel on the high-µ surface is pressurized in a pressurization mode, and in the pressurization mode one of the front wheels on low-µ surface is set to a decompression mode in the anti-skid control, the second case being that the difference between the estimations of the wheel cylinder pressures for the front wheels is larger than a threshold; and controlling in a third case the amount of the current for the solenoid of the boost control valve for the wheel on the high-µ surface so as to gradually increase the wheel cylinder pressure for the wheel on the high-µ surface at a first increase rate which is smaller than that in the case that the boost control valve is set to the communicated state, the third case being that the wheel on the low-µ surface is not set to a decompression mode in the anti-skid control, and the difference between the estimated wheel cylinder pressure for the front wheels is equal to or smaller than the threshold, wherein the third means repeats, when the fourth means gradually increases the wheel cylinder pressure at the first increase rate, the cycle in which the differential pressure is switched between the first differential pressure and the second differential pressure.

Hereinafter, an explanation is given as to how the aforementioned advantage is obtained.

Figure 8:
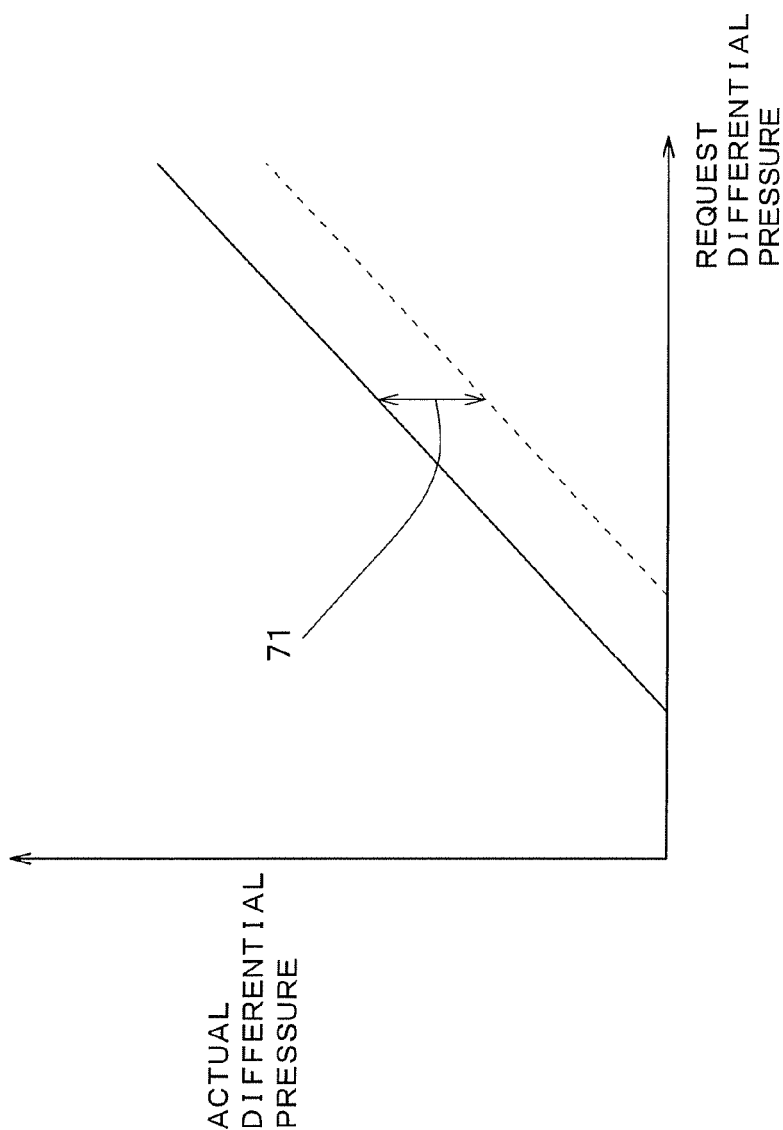
FIG. 8 is a graph showing characteristics of a differential pressure versus a request differential pressure (or an indicator current), the characteristics varying caused by individual variation of boost control valves.
Figure 9:
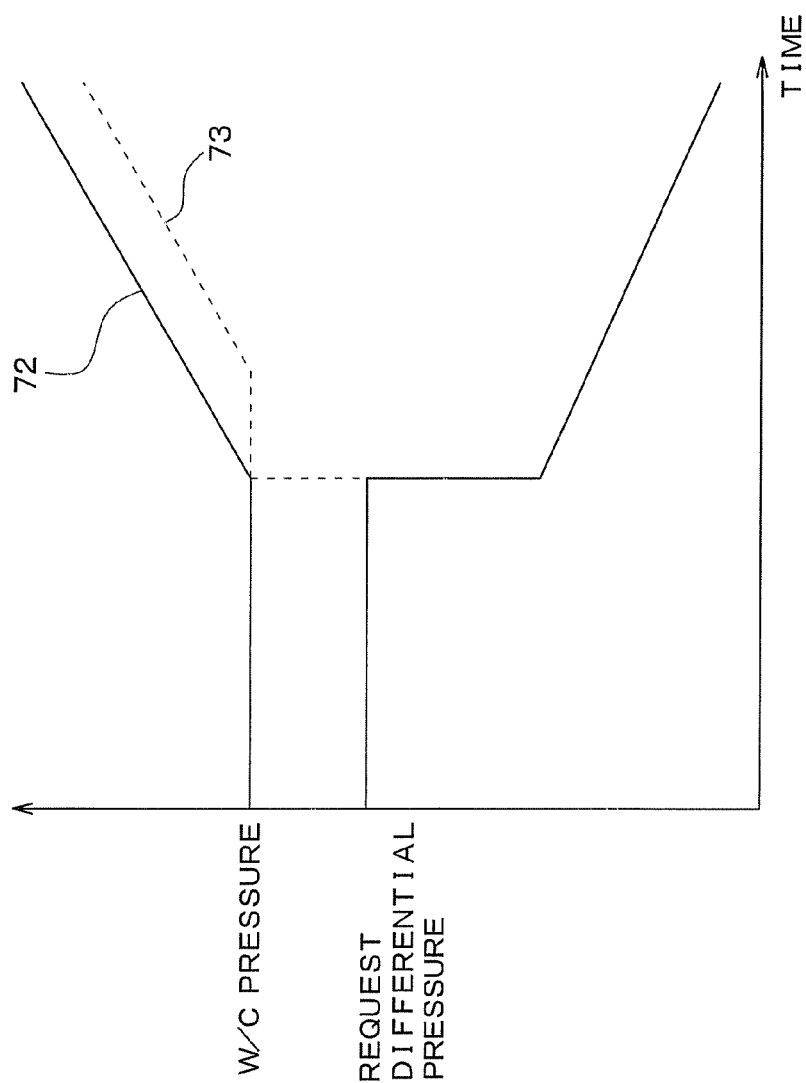
FIG. 9 is a graph showing changes in W/C pressures of wheels in the case the request differential pressures (or the indicator currents) to the boost control valves are decreased linearly and gradually, as is done conventionally.

FIG. 8 is a graph showing characteristics of the differential pressure versus the request differential pressure (or the indicator current). The characteristics vary caused by the individual variation of the boost control valves 17 and 37. FIG. 9 is a graph showing the changes in W/C pressures of the wheels FL and FR in the case that the request differential pressures (or the indicator currents) to the boost control valves 17 and 37 are decreased linearly and gradually, as is done conventionally.

As shown in FIG. 8, the individual variation of the boost control valves 17 and 37 sometimes cause the deviation in the characteristics of the differential pressure which is actually generated versus the request differential pressure (or the indicator current) between the boost control valves 17 and 37. For example, one of the boost control valves 17 and 37 has the characteristics shown by the solid line in FIG. 8 and the other one of boost control valves 17 and 37 has characteristics shown by the dashed line in FIG. 8. In this case, as shown by an arrow 71 in FIG. 8, the differential pressures actually generated at the boost control valves 17 and 37 differs even if the same request differential pressure or the indicator current is supplied to the boost control valves 17 and 37. Therefore, when the request differential pressures or the indicator currents are decreased linearly and gradually, the W/C pressures corresponding to the boost control valves 17 and 37 may change as shown in FIG. 9. In FIG. 9, one 72 of the W/C pressures gradually increases in accordance with the decrease of the request differential pressure or the indicator current, while the other one 73 increases with a delay which is caused by the individual variation.

Therefore, the difference between two W/C pressures is always generated because of the individual difference of the boost control valves 17 and 37 while the request differential pressures or the indicator currents are decreased gradually in the same manner. When the control is switched from the decompression control to the pressurization control, the request differential pressures for the boost control valves 17 and 37 are decreased in no time from the maximum value to a value corresponding to a pressure difference actually generated at the time of switching between the pressure of the M/C 13 and the W/C pressure. The maximum value is a value with which the boost control valves 17 and 37 are set to the closed state. After the sudden decrease, the request differential pressures or the indicator currents are decreased linearly and gradually.

At this time, the estimated W/C pressures are calculated without taking the individual variation of the boost control valves 17 and 37 into account, and the differential pressures between the master cylinder pressures and the W/C pressures are calculated based on the estimated W/C pressures, although the individual variation causes the differential pressures actually generated in the time of switching to differ from each other. Therefore, as shown in FIG. 9 the request differential pressures and the indicator currents do not reflect the individual variation. As a result, the W/C pressure corresponding to one of the boost control valves 17 and 37 may not start increasing immediately after the control is switched from the decompression control to the pressurization control, even if the other one of the boost control valves 17 and 37 receives the request differential pressure or indicator current corresponding to the differential pressure actually generated at the time of switching and, accordingly, the W/C pressure corresponding to the other one boost control valve immediately starts increasing.

Therefore, the difference between two W/C pressures for the wheels FL and FR grows because the individual variation of the boost control valves 17 and 37 cause the deviation in the increase of the W/C pressures.

Figure 10:
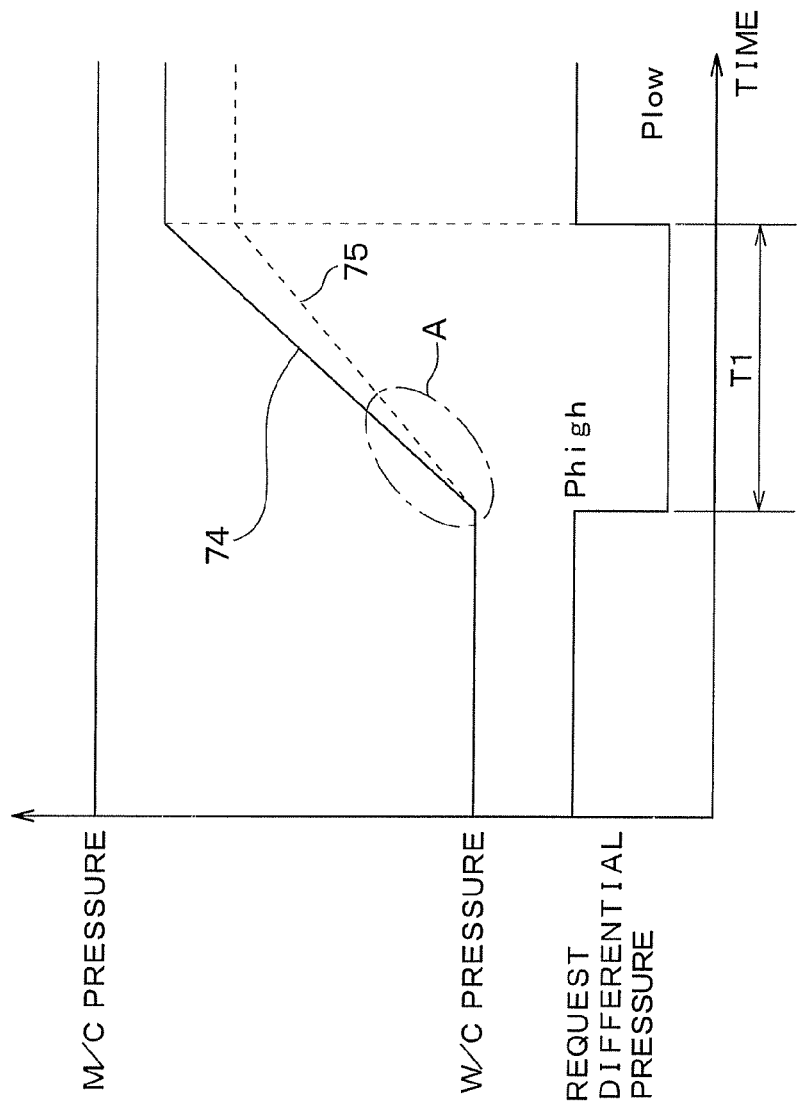
FIG. 10 is a graph showing changes of the W/C pressures for the left and right front wheels in the situation that the W/C pressures for both wheels are decreased to a predetermined value while the request differential pressures are a second differential pressure, and then the request differential pressures are set to a first differential pressure for a predetermined period.

In contrast, the brake ECU 70 of the present embodiment switches the request differential pressure between the first differential pressure P_low and the second differential pressure P_high. The ECU 70 is thus an example of current-supply-amount control means for controlling the amount of current to be supplied to the solenoid of the boost control valve in performing a pressurization control for the wheel under the anti-skid control so that a cycle is repeated in which the differential pressure to be generated between the upstream side and the downstream side of the boost control valve is switched between the first differential pressure and the second differential pressure. FIG. 10 is a graph showing changes of the W/C pressures 74, 75 for the left and right front wheels FL and FR in the situation that the W/C pressures for both wheels FL and FR are decreased to a predetermined value while the request differential pressures are the second differential pressure P_high, and then the request differential pressures are set to the first differential pressure P_low for a predetermined period T1. In FIG. 10, the boost control valves 17 and 37 are supposed to have the individual variation shown in FIG. 8.

Figure 11:
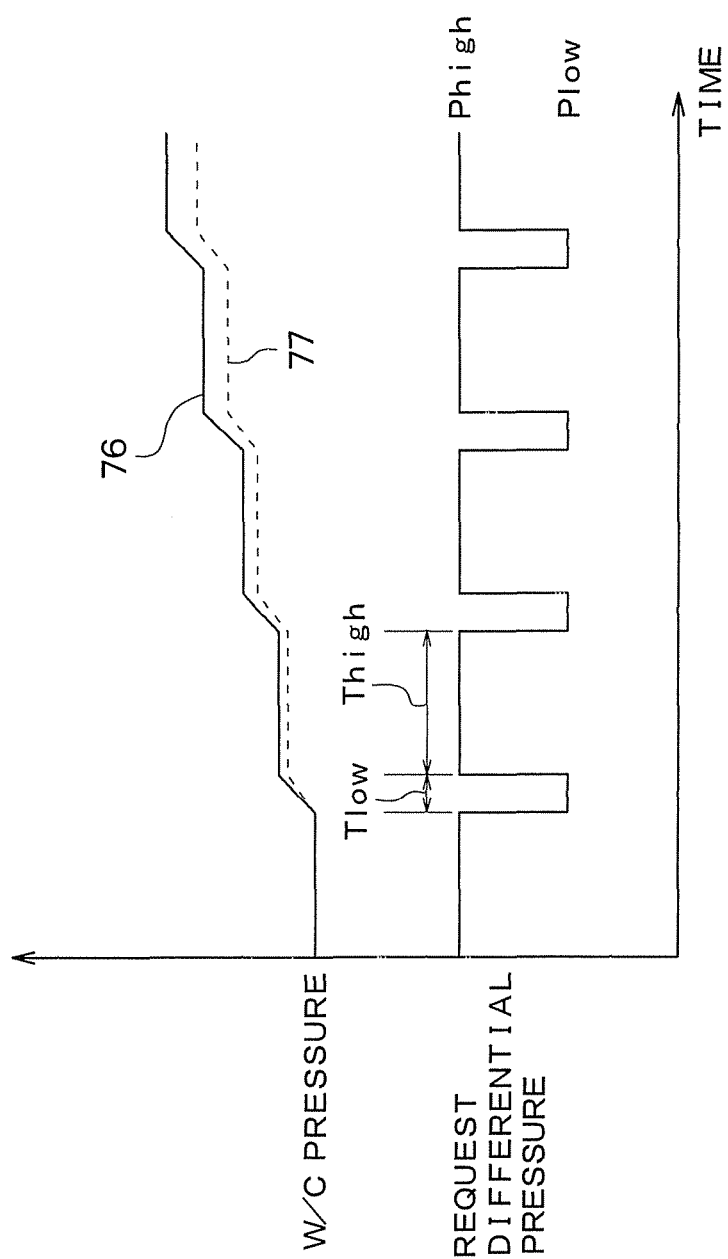
FIG. 11 is a graph showing changes of the W/C pressures for the left and right front wheels in the case that the request differential pressures are repeatedly switched alternately between the first differential pressure and the second differential pressure.

FIG. 11 is a graph showing changes of the W/C pressures 76, 77 for the left and right front wheels FL and FR in the case that the request differential pressures are repeatedly switched alternately between the first differential pressure P_low and the second differential pressure P_high as described in the present embodiment. In FIG. 11, the boost control valves 17 and 37 are supposed to have the individual variation shown in FIG. 8.

As shown in FIG. 10, the boost control valves 17 and 37 have the individual variation. Therefore, deviation is generated between the two differential pressures which are generated between the upstream side and the downstream side of the boost control valves 17 and 37 when the request differential pressures are set to the first differential pressure P_low and the predetermined time T1 passes. Thus, the increase rates for the W/C pressures for the wheels FL and FR differ.

However, the deviation between the two differential pressures which are actually generated between the upstream side and the downstream side of the boost control valves 17 and 37 does not grow exceedingly if a time period during which the first differential pressure is maintained is sufficiently short, because the deviation increases in accordance with the length of the time period which has passed after the request differential pressures are switched from the second differential pressure P_high to the first differential pressure P_low.

Therefore, if the request differential pressures are repeatedly switched alternately at a short interval between the first differential pressure P_low and the second differential pressure P_high as described in the present embodiment, the first differential pressure P_low is maintained for the short time period corresponding to an area A surrounded by the alternate long and short dash line in FIG. 10. Therefore, the difference between the two W/C pressures caused by the individual variation of the boost control valves 17 and 37 does not increase exceedingly.

More specifically, if the request differential pressures are repeatedly switched alternately at a short interval between the first differential pressure P_low and the second differential pressure P_high as shown in FIG. 11, the W/C pressures for both of the wheels FL and FR start increasing as soon as the request differential pressures are set to the first differential pressure P_low. At this time, the difference between the increase rates of the W/C pressures is generated as shown in FIG. 10 because of the individual variation of the boost control valves 17 and 37. However, the time period from a time instant when the request differential pressure is set to the first differential pressure P_low to another time instant when the request differential pressure is set to the second differential pressure P_high is the first period T_low which is sufficiently short. Therefore, the difference between the two W/C pressures does not increase as much as that in the case the request differential pressures or the indicator currents are not pulse waves.

Thus, it is possible to suppress the difference, if any, caused by the individual variation between the boost control valves 17 and 37. In addition, the request differential pressure is set to the first differential pressure P_low, which is smaller than a conventional request differential pressure. The conventional request differential pressure is outputted in switching from the decompression control to the pressurization control and corresponds to the differential pressure actually generated between the master cylinder pressure and the W/C pressure. Therefore, the first differential pressure P_low can achieve an increase of the W/C pressures to a satisfactory extent, while the conventional request pressure causes a situation as shown in FIG. 9 that either one of the W/C pressures cannot increased immediately.

In addition, the request differential pressures are switched from the first differential pressure P_low to the second differential pressure P_high after the first differential pressure P_low has continued for the short period. Therefore, it is possible to prevent the W/C pressures from increasing at an exceeding rate even if the first differential pressure P_low is small.

Therefore, it is possible to suppress the individual variation in the capability for W/C pressure boosting, and accordingly to suppress the difference of the W/C pressures between the right front wheel FR and the left front wheel FL. Thus, it is possible to suppress the yaw torque applied to the vehicle and therefore to suppress the spin of the vehicle.

After that, when the wheel on the low-μ surface is set to the decompression mode, the W/C pressure for the wheel on the high-μ surface is held and the operations described above are repeated.

As described above, the brake ECU 70 of the present embodiment gradually increases the W/C pressure for the boost control valve 17 or 37 for the front wheel FR or FL on the high-μ surface, by repeating the cycle in which the differential pressure for the boost control valve at the high-μ surface side is kept at the first differential pressure P_low for a first period T_low, and after that kept at the second differential pressure P_high for a second period T_high. Therefore, it is possible to suppress the individual variation in the capability for W/C pressure boosting, and accordingly to suppress the difference of the W/C pressures between the right front wheel FR and the left front wheel FL. Thus, it is possible to suppress the yaw torque applied to the vehicle and therefore to suppress the spin of the vehicle.

Other Embodiments

In the above embodiment, in order to generate the first differential pressure P_low between the upstream side and the downstream side of the boost control valve 17 or 37 corresponding to the front wheel FR or FL on the high-μ surface, the brake ECU 70 supplies the solenoid of the boost control valve at the high-μ surface side with a current an amount of which is equal to or slightly larger than the minimum value (i.e. zero), wherein the minimum value is the amount of a current for putting the boost control valve 17 and 37 in the communicated state.

However, if the amount of current supplied to the solenoid is equal to the minimum value, the valve body of the boost control valves 17 and 37 has to be moved all the way to the place farthest from the valve seat every time the request differential pressure is switched from the second differential pressure P_high to the first differential pressure P_low, and pulsation and oil hammer of the brake fluid accordingly occur. Therefore, it is better to set the amount of the current to the solenoid to the value slightly larger than the minimum value in achieving the first differential pressure P_low.

In the above embodiment, in order to generate the second differential pressure P_high between the upstream side and the downstream side of the boost control valve 17 or 37 corresponding to the front wheel FR or FL on the high-μ surface, the brake ECU 70 supplies the solenoid of the boost control valve at the high-μ surface side with a current an amount of which is equal to or slightly smaller than the maximum value wherein the maximum value is the amount of current for putting the boost control valve 17 and 37 in the closed state (more specifically, a state in which the valve is fully closed).

However, if the amount of current supplied to the solenoid is equal to the maximum value, the valve body of the boost control valves 17 and 37 has to be moved to the place where the valve body touches the valve seat every time the request differential pressure is switched from the first differential pressure P_low to the second differential pressure P_high, and pulsation and oil hammer of the brake fluid accordingly occur. Therefore, it is better to set the amount of the current to the solenoid to the value slightly smaller than the maximum value in achieving the second differential pressure P_low.

In addition, the brake ECU 70 of the above embodiment gradually increases the W/C pressure for the boost control valve 17 or 37 for the front wheel FR or FL on the high-μ surface, by repeating the cycle in which the differential pressure for the boost control valve at the high-μ surface side is kept at the first differential pressure P_low for a first period T_low, and after that kept at the second differential pressure P_high for a second period T_high.

However, this operation is just one of good examples. The cycle can be repeated in the case that the boost control valves 17 and 37 are driven linearly and that the W/C pressures are increased normally (i.e. not gradually). However, it should be noted that in the case that the cycle is repeated while the W/C pressures are increased gradually, effect of the deviation of the pressure increase rate caused by the individual variation becomes prominent. Therefore, it is better to repeat the cycle in the case of soft pressurization.

In the above embodiment, an ABS control on a μ-split surface is described as an example of pressurization of the boost control valves 17 and 37. However, the present invention can be applied to a normal ABS control as well as the ABS control on a μ-split surface.

In addition, the present invention can be applied not only to a situation in which the control is switched from the decompression control to the pressurization control but also to an ABS control device for performing another kind of ABS control which performs the hold control when the slip ratio of a wheel increases and which performs the pressurization control based on the slip ratio after the hold control in order to prevent the wheel from locking.

In addition, the present invention can be applied to an automatic brake control in which the W/C pressure is automatically increased. For example, an automatic brake control (e.g. an anti-side slip control, an active cruise control, and a traction control) in which a pump sucks and discharges the brake fluid and the W/C pressure is generated for a wheel under the automatic brake control. The automatic brake control device performing this automatic brake control can be obtained by connecting a conduit with the brake control device shown in FIG. 2 so as to supply the brake fluid, for example, from the M/C 13 or the master reservoir 13e through the conduit to the pump 19, 39, and further by locating a differential pressure control valve at the M/C 13 side of the boost control valves 17, 18 within the conduit A or at the M/C 13 side of the boost control valves 37, 38 within the conduit E, wherein the differential pressure control valve is for holding a differential pressure between the master reservoir pressure and the W/C pressure.

It should be noted that each of the steps in the figures corresponds to a means for executing a process described in the step.

What is claimed is:

1. An anti-skid control device for a vehicle, comprising:
an anti-skid control means for:
linearly changing, when an anti-skid control is started to prevent the vehicle from locking while braking, an amount of a current to be supplied to a solenoid of a boost control valve which controls, when a pressurization control in the anti-skid control is in operation, increase of a pressure of a wheel cylinder for a wheel being under the anti-skid control;
accordingly controlling a differential pressure between an upstream side and an downstream side of the boost control valve; and
accordingly pressurizing the wheel cylinder; and
a current-supply-amount control means for controlling the amount of the current to be supplied to the solenoid of the boost control valve in performing a pressurization control whenever effecting pressure increase in the wheel under the anti-skid control so that a cycle is repeated in which the differential pressure to be generated between the upstream side and the downstream side of the boost control valve is switched between a first differential pressure and a second differential pressure which is larger than the first differential pressure.

2. An anti-skid control device for a vehicle, comprising:
a select-low control means for:
performing a select-low control when the vehicle is running on a μ-split surface having areas with different friction coefficients μ, the areas being respectively below a left side part and a right side part of the vehicle, the select-low control being for starting a decompression control in the anti-skid control for the wheel on a high-μ surface as well as for the wheel on the low-μ surface irrespective of whether the wheel on the high-μ surface satisfies a condition for starting the anti-skid control, wherein the high-μ surface is one of the areas having the higher friction coefficient μ and the low-μ surface is the other one of the areas;
further changing linearly, when a pressurization control in the anti-skid control is in operation, an amount of a current to be supplied to a solenoid of a boost control valve which controls increase of a pressure of a wheel cylinder for a wheel being under the decompression control;
accordingly controlling a differential pressure between an upstream side and an downstream side of the boost control valve; and
accordingly pressurizing the wheel cylinder;
a first means for calculating estimations of wheel cylinder pressures for left and right front wheels of the vehicle;
a second means for determining based on the estimations of the wheel cylinder pressures whether the vehicle is running on the μ-split surface and which one of the left side part and the right side part of the vehicle is on the high-μ surface;
a third means for controlling, whenever a pressurization control is performed to effect pressure increase in the wheel on the high-μ surface of the μ-split surface, the amount of the current to be supplied to the solenoid of the boost control valve for the wheel on the high-μ surface so that a cycle is repeated in which the differential pressure to be generated between the upstream side and the downstream side of the boost control valve for the wheel on the high-μ surface is switched between a first differential pressure and a second differential pressure which is larger than the first differential pressure; and
wherein the third means supplies the solenoid with a second current in switching to the second differential pressure, wherein an amount of the second current is smaller than a maximum value, and the maximum value is an amount of a current for putting the boost control valve in a closed state.

3. The anti-skid control device according to claim 2, wherein the third means keeps the differential pressure to be generated between the upstream side and the downstream side of the boost control valve for the wheel on the high-μ surface at the first differential pressure for a first period and after the first period at the second differential pressure for a second period.

4. The anti-skid control device according to claim 3, further comprising a fourth means for:
holding the wheel cylinder pressure for one of the front wheels on the high-μ surface in first and second cases, the first case being that the anti-skid control is started on the μ-split surface, then the front wheel on the high-μ surface is decompressed in a decompression mode, then the front wheel on the high-μ surface is pressurized in a pressurization mode, and in the pressurization mode one of the front wheels on low-μ surface is set to a decompression mode in the anti-skid control, the second case being that the difference between the estimations of the wheel cylinder pressures for the front wheels is larger than a threshold; and
controlling in a third case the amount of the current for the solenoid of the boost control valve for the wheel on the high-μ surface so as to gradually increase the wheel cylinder pressure for the wheel on the high-μ surface at a first increase rate which is smaller than that in the case that the boost control valve is set to the communicated state, the third case being that the wheel on the low-μ surface is not set to a decompression mode in the anti-skid control, and the difference between the estimated wheel cylinder pressure for the front wheels is equal to or smaller than the threshold,
wherein the third means repeats, when the fourth means gradually increases the wheel cylinder pressure at the first increase rate, the cycle in which the differential pressure is switched between the first differential pressure and the second differential pressure.

5. The anti-skid control device according to claim 2, wherein the third means supplies the solenoid with a first current in switching to the first differential pressure, wherein an amount of the first current is larger than a minimum value, and the minimum value is an amount of a current for putting the boost control valve in a communicated state.

6. The anti-skid control device according to claim 5, further comprising a fourth means for:
holding the wheel cylinder pressure for one of the front wheels on the high-μ surface in first and second cases, the first case being that the anti-skid control is started on the μ-split surface, then the front wheel on the high-μ surface is decompressed in a decompression mode, then the front wheel on the high-μ surface is pressurized in a pressurization mode, and in the pressurization mode one of the front wheels on low-μ surface is set to a decompression mode in the anti-skid control, the second case being that the difference between the estimations of the wheel cylinder pressures for the front wheels is larger than a threshold; and
controlling in a third case the amount of the current for the solenoid of the boost control valve for the wheel on the high-μ surface so as to gradually increase the wheel cylinder pressure for the wheel on the high-μ surface at a first increase rate which is smaller than that in the case that the boost control valve is set to the communicated state, the third case being that the wheel on the low-μ surface is not set to a decompression mode in the anti-skid control, and the difference between the estimated wheel cylinder pressure for the front wheels is equal to or smaller than the threshold,
wherein the third means repeats, when the fourth means gradually increases the wheel cylinder pressure at the first increase rate, the cycle in which the differential pressure is switched between the first differential pressure and the second differential pressure.

7. The anti-skid control device according to claim 2, further comprising a fourth means for:
holding the wheel cylinder pressure for one of the front wheels on the high-μ surface in first and second cases, the first case being that the anti-skid control is started on the μ-split surface, then the front wheel on the high-μ surface is decompressed in a decompression mode, then the front wheel on the high-μ surface is pressurized in a pressurization mode, and in the pressurization mode one of the front wheels on low-μ surface is set to a decompression mode in the anti-skid control, the second case being that the difference between the estimations of the wheel cylinder pressures for the front wheels is larger than a threshold; and controlling in a third case the amount of the current for the solenoid of the boost control valve for the wheel on the high-μ surface so as to gradually increase the wheel cylinder pressure for the wheel on the high-μ surface at a first increase rate which is smaller than that in the case that the boost control valve is set to the communicated state, the third case being that the wheel on the low-μ surface is not set to a decompression mode in the anti-skid control, and the difference between the estimated wheel cylinder pressure for the front wheels is equal to or smaller than the threshold, wherein the third means repeats, when the fourth means gradually increases the wheel cylinder pressure at the first increase rate, the cycle in which the differential pressure is switched between the first differential pressure and the second differential pressure.

8. The anti-skid control device according to claim 2, wherein the third means supplies the solenoid with a first current in switching to the first differential pressure, wherein an amount of the first current is larger than a minimum value, and the minimum value is an amount of a current for putting the boost control valve in a communicated state.

9. The anti-skid control device according to claim 8, further comprising a fourth means for:

holding the wheel cylinder pressure for one of the front wheels on the high-μ surface in first and second cases, the first case being that the anti-skid control is started on the μ-split surface, then the front wheel on the high-μ surface is decompressed in a decompression mode, then the front wheel on the high-μ surface is pressurized in a pressurization mode, and in the pressurization mode one of the front wheels on low-μ surface is set to a decompression mode in the anti-skid control, the second case being that the difference between the estimations of the wheel cylinder pressures for the front wheels is larger than a threshold; and controlling in a third case the amount of the current for the solenoid of the boost control valve for the wheel on the high-μ surface so as to gradually increase the wheel cylinder pressure for the wheel on the high-μ surface at a first increase rate which is smaller than that in the case that the boost control valve is set to the communicated state, the third case being that the wheel on the low-μ surface is not set to a decompression mode in the anti-skid control, and the difference between the estimated wheel cylinder pressure for the front wheels is equal to or smaller than the threshold, wherein the third means repeats, when the fourth means gradually increases the wheel cylinder pressure at the first increase rate, the cycle in which the differential pressure is switched between the first differential pressure and the second differential pressure.

10. An anti-skid control device for a vehicle, comprising:

a select-low control means for:

performing a select-low control when the vehicle is running on a μ-split surface having areas with different friction coefficients μ, the areas being respectively below a left side part and a right side part of the vehicle, the select-low control being for starting a decompression control in the anti-skid control for the wheel on a high-μ surface as well as for the wheel on the low-μ surface irrespective of whether the wheel on the high-μ surface satisfies a condition for starting the anti-skid control, wherein the high-μ surface is one of the areas having the higher friction coefficient μ and the low-μ surface is the other one of the areas;

further changing linearly, when a pressurization control in the anti-skid control is in operation, an amount of a current to be supplied to a solenoid of a boost control valve which controls increase of a pressure of a wheel cylinder for a wheel being under the decompression control;

accordingly controlling a differential pressure between an upstream side and an downstream side of the boost control valve; and accordingly pressurizing the wheel cylinder;

a first means for calculating estimations of wheel cylinder pressures for left and right front wheels of the vehicle;

a second means for determining based on the estimations of the wheel cylinder pressures whether the vehicle is running on the μ-split surface and which one of the left side part and the right side part of the vehicle is on the high-μ surface;

a third means for controlling, whenever a pressurization control is performed to effect pressure increase in the wheel on the high-μ surface of the μ-split surface, the amount of the current to be supplied to the solenoid of the boost control valve for the wheel on the high-μ surface so that a cycle is repeated in which the differential pressure to be generated between the upstream side and the downstream side of the boost control valve for the wheel on the high-μ surface is switched between a first differential pressure and a second differential pressure which is larger than the first differential pressure; and a fourth means for:

holding the wheel cylinder pressure for one of the front wheels on the high-μ surface in first and second cases, the first case being that the anti-skid control is started on the μ-split surface, then the front wheel on the high-μ surface is decompressed in a decompression mode, then the front wheel on the high-μ surface is pressurized in a pressurization mode, and in the pressurization mode one of the front wheels on low-μ surface is set to a decompression mode in the anti-skid control, the second case being that the difference of the wheel cylinder pressure estimations between the front wheels is larger than a threshold; and controlling in a third case the amount of the current for the solenoid of the boost control valve for the wheel on the high-μ surface so as to gradually increase the wheel cylinder pressure for the wheel on the high-μ surface at a first increase rate which is smaller than that in the case that the boost control valve is set to the communicated state, the third case being that the wheel on the low-μ surface is not set to a decompression mode in the anti-skid control, and the difference between the estimated wheel cylinder pressure for the front wheels is equal to or smaller than the threshold, wherein the third means repeats, when the fourth means gradually increases the wheel cylinder pressure at the first increase rate, the cycle in which the differential pressure is switched between the first differential pressure and the second differential pressure.

11. An automatic brake control device for a vehicle, comprising:
a first control means for:
sucking and discharging brake fluid by means of a pump so as to generate a wheel cylinder pressure at a wheel cylinder for a wheel being under an automatic brake control; and
linearly changing, when a pressurization control in the automatic brake control is in operation, an amount of a current to be supplied to a boost control valve for controlling pressurization of a wheel cylinder so as to control a differential pressure between an upstream side and downstream side of the boost control valve; and
a current-supply-amount control means for controlling the amount of the current to be supplied to the solenoid of the boost control valve in performing a pressurization control whenever effecting pressure increase in the wheel under the automatic brake control so that a cycle is repeated in which the differential pressure to be generated between the upstream side and the downstream side of the boost control valve is switched between a first differential pressure and a second differential pressure which is larger than the first differential pressure.

* * * * *